United States Patent
Bonner et al.

(10) Patent No.: US 8,050,984 B2
(45) Date of Patent: Nov. 1, 2011

(54) SYSTEMS OF INFLUENCING SHOPPER'S PRODUCT SELECTION AT THE FIRST MOMENT OF TRUTH BASED UPON A SHOPPER'S LOCATION IN A RETAIL ESTABLISHMENT

(75) Inventors: Brett Bracewell Bonner, New Richmond, OH (US); Christopher Todd Hjelm, Cincinnati, OH (US); Titus Arthur Jones, Hebron, KY (US); John Edward Osborne, II, Indian Springs, OH (US); Dion Brent Perkins, Cincinnati, OH (US); Gregory Michael Menz, Cincinnati, OH (US)

(73) Assignee: Sunrise R&D Holdings, LLC, Cincinnati, OH (US)

( * ) Notice: Subject to any disclaimer, the term of this patent is extended or adjusted under 35 U.S.C. 154(b) by 0 days.

(21) Appl. No.: 12/837,465

(22) Filed: Jul. 15, 2010

(65) Prior Publication Data
US 2011/0106624 A1    May 5, 2011

Related U.S. Application Data

(63) Continuation-in-part of application No. 12/609,224, filed on Oct. 30, 2009, now Pat. No. 7,783,527, which is a continuation-in-part of application No. 12/353,817, filed on Jan. 14, 2009, now Pat. No. 7,734,513, and a continuation-in-part of application No. 12/353,760, filed on Jan. 14, 2009, now Pat. No. 7,739,157, and a continuation-in-part of application No. 12/408,581, filed on Mar. 20, 2009, now Pat. No. 7,742,952, and a continuation-in-part of application No. 12/058,705, filed on Mar. 29, 2008, and a continuation-in-part of application No. 12/172,326, filed on Jul. 14, 2008, now Pat. No. 7,672,876, and a continuation-in-part of application No. 11/859,703, (Continued)

(51) Int. Cl.
*G06Q 30/00* (2006.01)
*H04L 12/56* (2006.01)
(52) U.S. Cl. ...................... 705/26.7; 370/406
(58) Field of Classification Search .............. 705/26, 705/26.7, 27; 370/406
See application file for complete search history.

(56) References Cited

U.S. PATENT DOCUMENTS
5,995,015 A    11/1999   DeTemple et al.
(Continued)

OTHER PUBLICATIONS

Robert Repas, "Industrial Sensing the Wireless Way," Machine Design, Jan. 6, 2005, pp. 104-110, V77 No. 1.

(Continued)

*Primary Examiner* — Jeffrey A Smith
*Assistant Examiner* — Brandy A Zukanovich
(74) *Attorney, Agent, or Firm* — Pillsbury Winthrop Shaw Pittman LLP

(57) ABSTRACT

Provided herein is a system or systems for influencing shoppers while they consider making purchasing decisions in a retail establishment. Specifically, the method identifies the first moment of truth and attempts to influence shoppers during a shopper's first moment of truth based on the shopper's location within the retail establishment. The method transmits an acceptable influential message and transmits the message through a communication network to a shopper tracking device, which is in close proximity to a shopper during a shopping trip throughout a retail establishment.

20 Claims, 13 Drawing Sheets

Related U.S. Application Data filed on Sep. 21, 2007, application No. 12/837,465, which is a continuation-in-part of application No. 12/609,246, filed on Oct. 30, 2009, now Pat. No. 7,792,710, which is a continuation of application No. 12/353,817, said application No. 12/609,246 is a continuation-in-part of application No. 12/353,760, and a continuation-in-part of application No. 12/408,581, and a continuation-in-part of application No. 12/058,705, and a continuation-in-part of application No. 12/172,326, and a continuation-in-part of application No. 11/859,703, said application No. 12/408,581 is a continuation-in-part of application No. 12/172,326, and a continuation-in-part of application No. 12/353,760, and a continuation-in-part of application No. 12/353,817, which is a continuation-in-part of application No. 12/058,705, and a continuation-in-part of application No. 12/172,326, said application No. 12/353,760 is a continuation-in-part of application No. 12/058,705, and a continuation-in-part of application No. 12/172,326, said application No. 12/058,705 is a continuation-in-part of application No. 11/859,703, said application No. 12/172,326 is a continuation-in-part of application No. 11/859,703.

(60) Provisional application No. 61/110,202, filed on Oct. 31, 2008, provisional application No. 61/070,344, filed on Mar. 21, 2008, provisional application No. 61/046,820, filed on Apr. 22, 2008, provisional application No. 61/065,166, filed on Feb. 8, 2008, provisional application No. 61/011,125, filed on Jan. 15, 2008, provisional application No. 61/069,076, filed on Mar. 12, 2008, provisional application No. 60/959,470, filed on Jul. 13, 2007.

(56) References Cited

U.S. PATENT DOCUMENTS

| | | |
|---|---|---|
| 6,382,357 B1 | 5/2002 | Morrison et al. |
| 6,659,344 B2 | 12/2003 | Otto et al. |
| 6,725,206 B1 | 4/2004 | Coveley |
| 6,820,062 B1 | 11/2004 | Gupta et al. |
| 7,167,799 B1 | 1/2007 | Dolgov et al. |
| 7,390,264 B2 | 6/2008 | Walker et al. |
| 7,555,444 B1 | 6/2009 | Wilson et al. |
| 2003/0217137 A1 | 11/2003 | Roese et al. |
| 2004/0111454 A1 | 6/2004 | Sorensen |
| 2005/0136944 A1 | 6/2005 | Misikangas et al. |
| 2005/0256782 A1 | 11/2005 | Sands et al. |
| 2006/0009152 A1 | 1/2006 | Millard et al. |
| 2006/0149628 A1 | 7/2006 | Chefalas et al. |
| 2006/0193262 A1 | 8/2006 | McSheffrey et al. |
| 2006/0200378 A1 | 9/2006 | Sorensen |
| 2006/0293968 A1 | 12/2006 | Brice et al. |
| 2007/0118429 A1 | 5/2007 | Subotovsky |
| 2007/0138268 A1 | 6/2007 | Tuchman |
| 2008/0032705 A1 | 2/2008 | Patel et al. |
| 2008/0040219 A1 | 2/2008 | Kim et al. |
| 2008/0056261 A1 | 3/2008 | Osborn et al. |
| 2008/0059297 A1 | 3/2008 | Vallier et al. |
| 2008/0170580 A1 | 7/2008 | Goldman et al. |
| 2008/0189170 A1 | 8/2008 | Ramachandra |
| 2008/0249865 A1 | 10/2008 | Angell et al. |

OTHER PUBLICATIONS

Mark Chediak, "Retail Technology; Grocers Get a Taste of Future; Store Owners Who Want to Stand Out in the Crowd These Days are Embracing Cutting-Edge Services," The Orlando Sentinel, Jan. 21, 2006.

Raymond R. Burke, "The Third Wave of Marketing Intelligence," Retailing in the 21st Century, pp. 159-171, 2010.

Sangeetha Shekar, et al., "iGrocer—A Ubiquitous and Pervasive Smart Grocery Shopping System," In Proceedings of the 2003 ACM Symposium on Applied Computing (Melbourne, FL, Mar. 9-12, 2003), pp. 645-652.

SYSTEMS OF INFLUENCING SHOPPER'S PRODUCT SELECTION AT THE FIRST MOMENT OF TRUTH BASED UPON A SHOPPER'S LOCATION IN A RETAIL ESTABLISHMENT

CROSS-REFERENCE TO RELATED APPLICATIONS

This patent application is a continuation-in-part of U.S. patent application Ser. No. 12/609,224 (filed Oct. 30, 2009) and U.S. patent application Ser. No. 12/609,246 (filed Oct. 30, 2009). This patent application cross-references and incorporates by reference U.S. Nonprovisional patent application Ser. No. 12/172,326 (filed Jul. 14, 2008), U.S. Nonprovisional patent application Ser. No. 12/058,705 (filed Mar. 29, 2008), U.S. Nonprovisional patent application Ser. No. 12/353,760 (filed Jan. 14, 2009) and U.S. Nonprovisional patent application Ser. No. 12/353,817 (filed Jan. 14, 2009).

FIELD OF THE INVENTION

The invention relates to a system that identifies and influences a shopper's decision to purchase products based upon the shopper's location while shopping within or about a retail establishment. Specifically, influencing a shopper's behavior includes influencing a shopper's purchase decisions at a shopper's first moment of truth by transmitting an influential message through a wireless communications multi-network to a wireless end device or personal device held in close proximity to the shopper during the shopping trip throughout the retail establishment.

BACKGROUND

Retailers are being squeezed by high commodity prices, high transportation costs, high labor costs, and the high cost of advertising inside and outside of their retail centers. Retailers now, more than ever, are having their profit margins decimated by events far beyond their control. Importantly, retailers, which control their own retail space, need to optimize use of that space in ways that include keen shopper understanding. Such shopper understanding is costly to obtain and is often incomplete. For example, the collection of shopper buying habits is known to be acquired at the point of sale. Such data collection is widespread and fails to provide granular insight as to a shopper's behavior, namely the reasons a shopper chooses a particular product for purchase. Today, retailers do not have a system with the ability to gain shopper insights at the point of purchase decision. The only known method of gaining a shopper's insight at the point of purchase decision is by hiring one or more persons skilled and trained at conducting focus group testing to follow shoppers in their retail store which is costly in both time and personnel resources.

Grocery stores are among those hardest hit, since their profit margins are often no more than one to two percent of a store's total sales. Currently, stores boost their profit margins by selling shelf space within the store like real estate. To increase the price of shelf space in stores and to encourage a greater variety of products within stores, stores need to provide vendors of wholesale products with a more effective and influential way of selling their products to the store's shoppers. Stores need a way to offer vendors effective systems and methods to influence shoppers at the first moment of truth when the shopper first encounters the product, allowing the vendors and retail establishments to sell more products. Vendors will pay premiums to stores employing such systems and methods.

Shoppers, too, are feeling the pinch of ever escalating commodity prices like crude oil, corn, and others. As a result, shoppers have become increasingly cost conscious of their monthly food bills. Yet, today's modern lifestyles do not provide shoppers the luxury of time to spend searching and cutting out coupons or other saving mechanisms typically offered by retailers. Therefore, shoppers need a way to make shopping easier, quicker and cheaper.

Retailer's currently use many elaborate in-store displays on aisles, end caps, shopping cart and shelves to seize the shopper's attention and influence product selections before, during, and after a shopper's product consideration. These convoluted attempts to get a shopper's attention are often ignored by shoppers who often attempt to get out of the store, as fast as possible, completing the task of shopping while talking on their cell phone or other personal handheld devices. In fact, prior art attempts to get shopper's attention at targeted locations are expensive, inefficient, ineffective and annoying; often decreasing the retailer's profit margin and increasing the cost which is passed through to the shopper.

Retail establishments need a low-cost, highly effective method for responding to and influencing a shopper's product selection and decision-making based on their location within a retail store. Such a method should aim to enhance, simply and expedite a shopper's experience with very little, if any, cost pass-through to shoppers and very little, in any negative impact to a store's profit margin. The retailer's need has been met by one or more embodiment's described below and will be explained with greater detail and particularity below.

SUMMARY

Accordingly, the invention relates to a system for identifying and influencing a shopper's product selection based on the shopper's location during the shopper's shopping trip in a retail establishment. A system comprises (1) a communications multi-network positioned about the retail establishment that comprises at least one mesh communication network and at least one star communication network; (2) a logic engine operatively connected to the communications multi-network, the logic engine managing the communications multi-network; and (3) a shopping tracking device positioned in close proximity to the shopper. The shopper tracking device creates shopper location data and is in tracked communication through the at least one mesh communication network of the communications multi-network with the logic engine. The logic engine creates at least one influential message based upon the shopper location data and delivers at least one influential message through the star communication network to the shopper.

In some embodiments, the shopper tracking device is in the form of a wireless end device provided to the shopper by the retail establishment which is positioned in close proximity to the shopper. In other embodiments, the shopper tracking device can be affixed to a grocery cart, or affixed to a shopper or to a shopper's personal device physically or is pre-installed within a shopper's personal device like any of the growing number of smartphones. Persons of skill in the art will readily recognize that the importance of the tracking device is that it is held in close proximity to a shopper, not its manner of fixation to a shopper. Multiple tracking devices, for redundancy's sake, may be assigned to one shopper.

In some embodiments, the logic engine comprises a map of the retail establishment wherein a two-dimensional X and Y grid is juxtaposed on top of the map of the retail establishment to provide each element on the map of the retail establishment with a set of X and Y positional coordinates. These maps are digital in nature and are stored and managed by the logic engine herein. All or a portion of a map herein may be transmitted from the logic engine to a shopper's handheld device, whether provided by the store or a personal device through the store's communication multi-network, and particularly the star communication network therein. In this embodiment, the products positioned about the retail establishment for purchase by the shopper have specified product locations of which the retail establishment is aware. In some embodiments, a product location map is provided, wherein the logic engine is aware of the majority of the locations of the products positioned about retail establishment.

In this execution, the wireless end device is operatively connected to a first moment of truth tracking system comprising a shopper tracking device which is tracked through the communications multi-network by the logic engine to produce shopper location data. Moreover, the wireless end device is operatively connected to a product scanning device. The shopper scans each product intended for purchase with the product scanning device to create product selection data. Further, the wireless end device transmits the product selection data to the logic engine which then compares the product selection data for a single product selected by the shopper with the shopper location data collected at the time the product selection data was collected.

The logic engine examines the shopper to product location ratio, the product selection location data and the product selection data of the shopper to determine whether a shopper is experiencing or has experience a first moment of truth, i.e., whether a shopper has entered the decision making process of choosing a product. Next, the logic engine creates an appropriate influential message and delivers it through the communications multi-network to the wireless end device positioned in close proximity to the shopper. Finally, the appropriate influential message influences the shopper just before, at, or near the first moment of truth.

Further embodiments of the present invention, as well as, the structure and the operation of these embodiments of the present invention, are described in detail below with reference to the accompanying drawings.

BRIEF DESCRIPTION OF THE DRAWINGS

While the specification concludes with claims particularly pointing out and distinctly claiming the invention, it is believed that the embodiments will be better understood from the following description in conjunction with the accompanying figures, in which:

DETAILED DESCRIPTION

Figure 1:
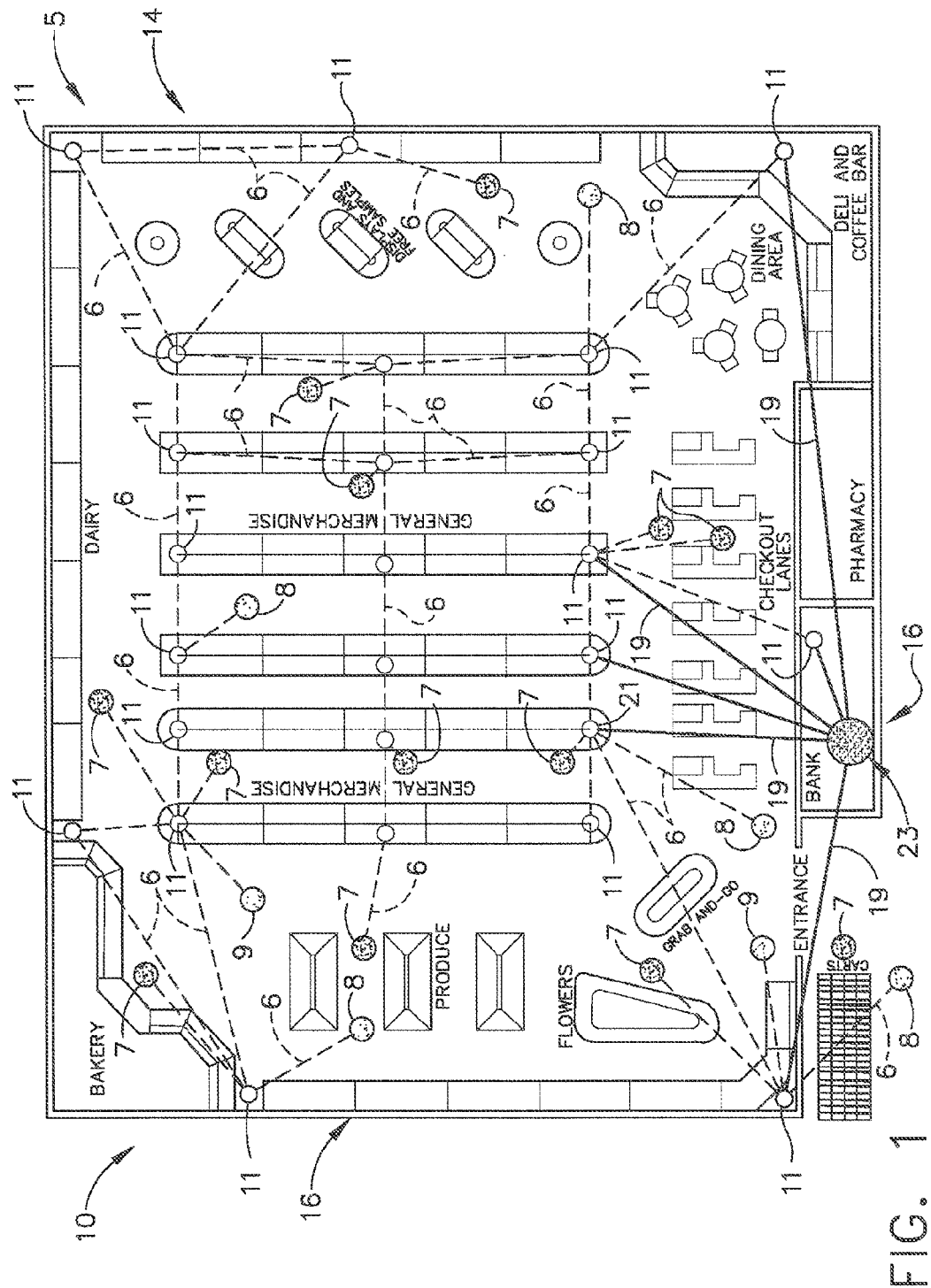
FIG. 1 is a schematic plan view of a retail environment having an exemplary store-based multi-network for communication.

The invention relates to a system for identifying and influencing a shopper's product selection based on the shopper's location during the shopper's shopping trip in a retail establishment. A system comprises (1) a communications multi-network positioned about the retail establishment that comprises at least one mesh communication network and at least one star communication network; (2) a logic engine operatively connected to the communications multi-network, the logic engine managing the communications multi-network; and (3) a shopping tracking device positioned in close proximity to the shopper. The shopper tracking device creates shopper location data and is in tracked communication through the at least one mesh communication network of the communications multi-network with the logic engine.

The logic engine creates at least one influential message based upon the shopper location data and delivers at least one influential message through the star communication network to the shopper. In some embodiments, the shopper tracking device is in the form of a wireless end device provided to the shopper by the retail establishment which is positioned in close proximity to the shopper. In other embodiments, the shopper tracking device can be affixed to a grocery cart, or affixed to a shopper or to a shopper's personal device physically or is pre-installed within a shopper's personal device like any of the growing number of smartphones. Persons of skill in the art will readily recognize that the importance of the tracking device is that it is held in close proximity to a shopper, not its manner of fixation to a shopper. Multiple tracking devices, for redundancy's sake, may be assigned to one shopper.

In some embodiments, the logic engine comprises a map of the retail establishment wherein a two-dimensional X and Y grid is juxtaposed on top of the map of the retail establishment to provide each element on the map of the retail establishment with a set of X and Y positional coordinates. These maps are digital in nature and are stored and managed by the logic engine herein. All or a portion of a map herein may be transmitted from the logic engine to a shopper's handheld device, whether provided by the store or a personal device through the store's communication multi-network, and particularly the star communication network therein. In this embodiment, the products positioned about the retail establishment for purchase by the shopper have specified product locations of which the retail establishment is aware. In some embodiments, a product location map is provided, wherein the logic engine is aware of the majority of the locations of the products positioned about retail establishment.

In this execution, the wireless end device is operatively connected to a first moment of truth tracking system comprising a shopper tracking device which is tracked through the communications multi-network by the logic engine to produce shopper location data. Moreover, the wireless end device is operatively connected to a product scanning device. The shopper scans each product intended for purchase with the product scanning device to create product selection data.

Further, the wireless end device transmits the product selection data to the logic engine which then compares the product selection data for a single product selected by the shopper with the shopper location data collected at the time the product selection data was collected. This creates a shopper to product location ratio.

The logic engine examines the shopper to product location ratio, the product selection location data and the product selection data of the shopper to determine whether a shopper is experiencing or has experience a first moment of truth, i.e., whether a shopper has entered the decision making process of choosing a product. Next, the logic engine selects or creates an appropriate influential message and delivers it through the communications multi-network to the wireless end device positioned in close proximity to the shopper. Finally, the appropriate influential message influences the shopper just before, at, or near the first moment of truth.

Further embodiments of the present invention, as well as, the structure and the operation of these embodiments of the present invention, are described in detail below with reference to the accompanying drawings.

The term "first moment of truth" as defined herein is the moment of purchase decision and/or the time required for a shopper to make a purchase decision that begins when the browsing shopper first encounters a product, persists through the consideration process of the product for purchase and concludes with the shopper's decision to choose or not choose to purchase the product encountered and considered. Additionally, key components of the first moment of truth include 1) the product considered for selection, 2) if selected for purchase, the product selected, 3) the amount of time that a shopper expends to consider a particular product for selection, 4) a shopper's presumed location in a store in relation to a product location at consideration of the product for selection (e.g., in produce, at a display, at an end-cap, etc.) and one, two, three, or four of any one of the four key elements noted hereinabove. Typically, the first moment of truth ranges in time from between about two to about seven seconds and sometimes longer. Persons of skill in the art will readily recognize that the first moment of truth may extend beyond the typical threshold and that such extension remains a part of the definition herein for the first moment of truth.

The term "first moment of truth experience" as used herein includes the entirety of the process to 1) consider a product for potential purchase and 2) the decision to either select a product for purchase or choose not to select a product for purchase.

The terms "intended purchase" and "intention of purchase" as used herein mean a shopper's removal of product from a store shelf, kiosk, or display in consideration of potential purchase, as well as, products a shopper has included on her shopping list.

The term "tracked communication" as used herein means the communications multi-network's ability to track wireless end devices when such devices are placed in close proximity to a shopper.

The term "gateway server" as used herein means a server that is receiving data from the communications multi-network of the store through a switch that is being routed by the gateway server to other store servers, such as an associate task managing server, a computer assisted ordering system computer, a point of sale server, location tracking server, an ISP server, or other store computer.

The term "computational functions" as used herein means any and all microprocessor or microcontroller based computational tasks or routines commonly known in the art to occur in a computer or computer-like device that comprises software, memory, and a processor.

The term "computational work" as used herein means those types of common computations associated with known computer and/or server types of devices having complex microcontrollers and/or central processing units (CPUs). Such devices performing computational work typically have the capacity to carry extensive software and execute any various types of routines and sub-routines therein.

The terms "influence" or "influencing" product selection mean the system's ability to make a shopper aware of the following: (1) potential health risks; (2) less expensive alternative product(s); (3) better rated alternative product(s); (4) complementary products to be added to soon-to-be or chosen product(s); and/or (5) product information. It should be noted herein that the "influence" or "influencing" causes a shopper to act, ideally, consistently with the retail establishments predetermined goals for the appropriate influential messages that were generated for the shopper during the shopping trip such that the shopper's behavior is consistent or inconsistent with shopper's typical purchase patterns, typical budget, shopping list, known brand preferences, sales and promotions or in accordance with the retail establishments predetermined goals.

The term "wireless end device" as used herein means an electronic device, and ideally a handheld electronic device, which operates wirelessly through a communications multi-network and is used in close proximity to the shopper as she travels throughout the retail establishment. Each wireless end device operates as a blind node throughout the communication network.

The term "blind node" as used herein means those nodes of the communications multi-network that are would be unknown to the system but for the tracking location subsystem.

In an exemplary embodiment, the wireless end device is coupled with a "product scanning device". As used herein, the term "product scanning device" refers to an electronic device for scanning readable media and can function but is not limited to taking photographs. A readable medium is a unique identifier for an item or class of items within the retail establishment that is capable of being read and understood by an electronic device and in some cases a human. A bar code is an example of a readable medium that can include but are not limited to a Global Trade Identification Number (GTIN), UPC, UPC-A, UPC-E, EAN13, EAN8, Databar (multiple versions), GS1-128, and any other product identification code known to persons with skill in the art.

In some exemplary embodiments, a wireless end device is temporarily coupled to an "intelligent shopping cart." An "intelligent shopping cart" as used herein similar in appearance to a conventional shopping cart in that it is located in close proximity to the shopper and holds the shopper's intended purchases, however, it is associated with, communicatively coupled and/or in tracked communications with the communications multi-network of the retail environment. The intelligent shopping cart can include a variety of devices which can be temporarily or permanently coupled to the shopping cart to provide an easier shopping experience including but not limited to, the above described wireless end device, a screen, an imager, above described product scanning device, a weighing device to receive and weight items, and the like.

Provided herein are systems for implementing a variety of ways to influence a shopper's product selection when the shopper shops throughout a retail environment with a wireless end device. In an exemplary embodiment, a retail establishment captures actual, real time shopper behavior data, the total sum of the shopper location data, product selection data and product selection timing data, prior to be used to create one or more influential messages. These various types data will be defined in turn.

The term "shopper location data" as used herein means the estimated location of the shopper as tracked through the first moment of truth tracking system, specifically a shopper tracking device associated with a wireless end device in relation to known product locations. Shopper location data is collected as a product of the tracking location subsystem, in which the logic engine tracks the presumed locations of a shopper as she travels with the wireless end device throughout the retail establishment. The shopper location is presumed because the retail establishment tracks only the location of the shopper tracking device associated with the wireless end device which is held in close proximity to shoppers and not the shopper. On occasion, shoppers walk away from their assigned wireless end device which is coupled with the location tracking device. On these occasions, the shopper location data is inaccurate. To be clear, shopper location data is accurate within a predetermined tolerated range of error.

The term "product selection data" as used herein means the information collected when a product scanning device scans the readable media of products selected for purchase by the shopper. The product selection data includes but is not limited to each product's identity (by name and/or internal code), price, the identity of the product's manufacturer, the identity of the retailer's supplier, the product weight or some similar unit of measurement (volume), the date and time stamp collected each product selection collected by a product scanning device and the like.

The term "product selection timing data" as used herein means the amount of time that the shopper spends during each time period of product selection, wherein the amount of time is tracked by the logic engine. The logic engine creates product selection timing data by beginning to record the amount of time that passes from the moment the shopper begins to slow her rate of travel throughout the store at the same time that her location matches up with a product location data through the moment that the shopper scans the readable medium of one or more products. Product selection timing data is determined and tracked by a timing device physically located within the wireless end device, timing software programmed on the wireless end device, or hardware or software operatively associated with the logic engine. In exemplary embodiments, the product selection timing data is deleted when a false first moment of truth is detected, as addressed in greater detail hereinbelow. The product selection timing data is known to the system, since her approximate positions are known as the shopper travels throughout the store, and this location tracking data can be assessed on a moment by moment basis in actual real time.

In an exemplary embodiment, the retail establishment, specifically through the logic engine, is aware of the location of each product or each group of products, known herein as product locations, because the store employees have recorded the locations of each group of products in a product database as they stocked the items in the store. The locations of the product groups are given coordinates on a product location map, just as nearly all other physical elements of the store are assigned coordinates on a two-dimensional X and Y grid positioned over, or juxtaposed on top of, the store map. In an exemplary embodiment, the retail establishment, through a logic engine, is aware of the precise location of over about eighty percent of the products on display in the retail establishment.

In alternative embodiments, the retail establishment is aware of the majority of product locations, the precise locations of the products on display in the retail establishment. Thus, with the knowledge of the presumed location of each wireless end device within the retail establishment through shopper location data collected in real-time, and with the knowledge of the product locations, the retail establishment can compare the shopper location data with the product locations to determine when a shopper is in close proximity to certain products on display within the retail establishment.

In practice, the system herein detects shopper's engagement in product selection when it detects that her rate of speed is substantially slower than the shopper's average rate of speed and when the shopper's presumed location in the store is in front of a product display in the store. Part of this detection includes the comparison of the two relative speeds between the time of product consideration for possible purchase and the typical shopper's typical travel through a store. In exemplary embodiments, the store has a detailed profile on the particular shopper, wherein the detailed profile includes the shopper's average rate of speed in the store, so that the logic engine's detection of a first moment of truth is highly accurate.

The term "actual, real time shopper behavior data" as used herein refers to as used herein means the total sum of a shopper's identification data, location tracking data, product scanning data and product selection timing data. Ideally, actual, real-time shopper behavior data also includes a shopper's personal and demographic profile.

The logic engine of the retail establishment, using the actual, real time shopper behavior data, creates and transmits an influential message to the wireless end device, which is in close proximity to the shopper as she shops within or about the retail establishment. In alternative embodiments, the retail establishment only uses product selection timing data and the shopper's location tracking data to create the influential messages that are then transmitted to the wireless end device in close proximity to the shopper as she shops within or about the retail establishment.

The logic engine creates "shopping trip timing data," which is referred to herein as the entire amount of time each shopper spends on her entire shopping trip. If the shopper has not completed her shopping trip, then the shopping trip timing data is incomplete, but reflects the amount of time the shopper has spent thus far on her current shopping trip. To create the shopping trip timing data, the logic engine records the entire amount of time the shopper spends in the store from the first moment the shopper's wireless end device associates with the store's communications multi-network to the time the shopper checks out from the store.

To be clear, the term "logic engine" as used herein means one or more electronic devices comprising a switch and a server. The logic engine includes hardware such as one or more server-grade computers, but also includes the ability to perform certain computational functions through software. Mechanisms known in the art other than software can be used provided that the mechanism allows the logic engine to go through logic functions to provide location calculations, evaluations, conduct timing, etc. The logic engine is additionally capable of performing the functions of the switch, gateway server, and store computers, such as an associate task managing server, a computer assisted ordering system computer, an in store processor (ISP server), the location tracking server, commerce server, or other store computer.

Further, the logic engine serves as the retail establishment's main database, including but not limited to the product database and the shopper profile database. Functionally, the logic engine routes, organizes, manages, and stores data received from other members of the communications multi-network. In exemplary embodiments, the logic engine has the means of performing ray tracing calculations and blind node location calculations. Though the embodiments described herein reference "a logic engine," it is contemplated that multiple logic engines can be used to perform the same function within the communications multi-network.

In the systems and methods disclosed herein, most, if not all, necessary wireless electronic communication between shoppers and the retail establishment occurs through a communications multi-network when the wireless electronic communication occurs within the retail establishment itself, upon the retail establishment's premises, which can include the boundary controlled by the retail establishment (e.g., the store parking lot). In embodiments where a communications multi-network is enabled, two or more communication networks work together, though not necessarily dependently, to track the location of the wireless end devices used by shoppers, to track the location of products, to track first moments of truth and to be aware of the identities of products and shoppers within or about the retail establishment. The communications multi-network comprises: (1) at least two mesh communication networks; (2) at least two star communication networks; (3) at least one star communication network and at least one mesh communication network through which the shopper tracking device operates; or (4) two or more other types of communication networks known to persons with skill in the art. In selected embodiments, the communications multi-network is a single network architecturally, but functionally operates as two or more differently functioning networks. For example, there may be a single network that functions as a star communication network and a mesh communication network at the same time.

An exemplary mesh communication network is a ZIGBEE communication network which operates within the Institute of Electrical and Electronics Engineers (IEEE) 802.15.4 communication protocol, but person with skill in the art will appreciate alternative communication protocols that can be employed instead of the 802.15.4. Some of the benefits of using ZIGBEE communication network as a mesh communication network are its low power consumption, low cost of implementation, high density of component use (e.g., the use of dozens, if not hundreds, of multi-network routers and/or wireless end devices for one mesh communication network), and its simple communications protocol. ZIGBEE protocols are intended for use in wireless communication networks requiring low data rates and low power consumption. ZIGBEE communication network also provides an inexpensive communications multi-network that can be used for industrial control, embedded sensing, medical data collection, smoke and intruder warning, building automation, home automation and many others. The resulting network uses very small amounts of power which can then allow individual devices to run for up to one year or more using originally installed batteries.

The ZIGBEE protocol operates in the industrial, scientific and medical (ISM) radio bands; i.e., 868 MHz in Europe, 915 MHz in the USA and 2.4 GHz in most other jurisdictions worldwide. ZIGBEE technology is intended to be simple, inexpensive and readily maintainable. In one execution, the most capable multi-network router within ZIGBEE communication network requires only about 10% of the software of a typical BLUETOOTH or other wireless internet node though a BLUETOOTH execution is also contemplated herein. In another execution, multi-network router only contains about 2% of the software of a typical BLUETOOTH or other wireless internet node for use within ZIGBEE communication network 15 thus greatly reducing technical complexity and potential maintenance costs.

The star communication network of communications multi-network also operates within the IEEE 802.15.4 communication protocol, although it could be operated on a different protocol, depending on the specific application contemplated. Moreover, each mesh communication network includes a mesh network organizer. In certain embodiments of the communications multi-network, the mesh network organizer is housed with a data communication radio in a device called the multi-network organizer, and one or more information routers.

The mesh network organizer, a radio for the mesh communication network, assigns addresses to all members of the mesh communication network. The mesh network organizer is the single point of entry to the mesh communication network from the gateway server. The mesh network organizer routes information, also known as packets of data, to and from information routers and the central store computer. In one embodiment, the mesh network organizer routes location tracking data to and from information routers and the logic engine. In one embodiment, the mesh network organizer communicates with the logic engine through an Ethernet cable, while communicating wirelessly through the mesh communication network to the other devices attached to the mesh communication network.

Other devices attached to the mesh communication network can include information routers, wireless end devices, intelligent shopping carts, HVAC monitors and controls, security systems, traffic counters, and other electronic devices depending on the specific application contemplated. Both communication between information routers, and communication between information routers and the mesh network organizer, can be wired or wireless. Functionally, the mesh network organizer routes location tracking data of wireless end devices of both associates and shoppers to managers. Because the mesh network organizer transmits data through a radio, it broadcasts or radiates out radio waves to other members of the mesh communication network.

The information routers, also known as stationary reference nodes, are end nodes and fixed members of the mesh communication network. Each stationary reference node operates through the mesh communication network to receive information from and send information to intelligent shopping carts, wireless end devices, the mesh network organizer, other information routers, and other network devices communicatively coupled to the mesh communication network. Each information router transmits Received Signal Strength Indication (RSSI), X and Y coordinates belonging to the position of the information router and the address of the closest data communication radio to any requesting wireless end device. Each information router comprises one or more radios. Examples include, but are not limited to, the following: Texas Instruments Models 2430 and 2431.

In those embodiments utilizing one or more star communication networks, the star communication network comprises data communication radios which operate as hub nodes or central nodes of each star communication network. The data communication radio routes data information, also known as packets of data, to and from wireless end devices and the logic engine. In one embodiment, the data communication radio transmits data through a wire, for example, an Ethernet cable, when communicating with the logic engine, while simultaneously communicating wirelessly through the star communication network to the wireless end devices, intelligent shopping carts, and/or other blind nodes and electrical devices attached to the star communication network.

Functionally, the data communication radio routes data, such as influential messages from the logic engine to the wireless end devices. The data communication radio broadcasts or radiates out radio waves to other members of the star communication network instead of communicating strictly in straight lines.

In exemplary embodiments of the communications multi-network that include a mesh communication network and a star communication network, the information router of the mesh communication network and the data communication radio of the star communication network are housed together in a device herein referred to as a multi-network router. Each the multi-network router houses at least three microcontroller unit (MCU) radios: one that functions as an information router for the mesh communication network, and at least two that function as data communication radios for the star communication network. Two of the three radios are low powered radios, including but not limited to Texas Instruments Models 2430 or 2431, while the third radio is a controller with greater power, such as the Texas Instruments models above the 243x series. Functionally, multi-network routers communicate wirelessly or over wires to other multi-network routers. Ideally, multi-network routers communicate wirelessly to the wireless end devices, intelligent shopping carts, and other electrical devices used by shoppers, associates, and managers within the store. The multi-network routers communicate with the central computer, or logic engine, through the multi-network organizer.

In exemplary embodiments, the location tracking of shoppers is conducted over the mesh communication network of the communications multi-network, though it is possible to operate such a tracking function over the star communication network. The wireless end device communicates with the stationary radios of a communications multi-network (the information routers of the mesh communication network, the data communication radios of the star communication network, or the multi-network router of the communications multi-network). The stationary radios transmit their X and Y set of positional coordinates to the wireless end device positioned in close proximity to the shopper as she moves throughout the retail establishment.

Furthermore, the signal strength of each stationary radio is measured either by the wireless end device, the logic engine, or another store server, such as the location tracking server. The X and Y set of positional coordinates of the wireless end device is calculated based on the signal strength measured and the X and Y set of positional coordinates of the nearest stationary routers. The subsystem of tracking the location of shoppers of certain embodiments of the invention are more fully described in U.S. Nonprovisional patent application Ser. No. 12,353,817 (filed Jan. 14, 2009), and U.S. Nonprovisional patent application Ser. No. 12,353,760 (filed Jan. 14, 2009), which are hereby incorporated fully by reference.

In an exemplary embodiment, the logic engine stores location data on products and shoppers within a store. In an example subsystem of tracking the location of shoppers, the logic engine creates an historical progression, which is a map of the path a shopper takes while shopping in a store. The logic engine matches the historical progression taken for a particular shopping trip with the list of items purchased by the shopper on the particular shopping trip.

To be clear, any computation or storage completed by the logic engine can be performed, in selected embodiments, by a specific server called the location tracking server. Thus, whenever a logic engine is used in this context herein, the use of a location tracking server is contemplated. The wireless end device continuously transmits its unique identifier address to the logic engine, allowing the logic engine to create a shopper location data. As used above, the term "continuously" herein means a predetermined interval of time, for example, every five seconds or every ten seconds, as determined by the software engineer. Moreover, when the wireless end device is stationary for a predetermined period of time programmed in the software of the wireless end device, the wireless end device automatically powers down or turns off and continuous transmission of the wireless end device's unique identifier address ceases. Any period of time can be set to be the predetermined period of time before the wireless end device powers down, such as ten minutes or thirty minutes. The benefit of the ability to automatically power down is reduced energy consumption. Furthermore, in exemplary embodiments, when the wireless end device returns to a state of motion from its stationary position, the wireless end device automatically powers on to restore the continuous transmission and tracking features.

In exemplary embodiments of the systems and methods herein, the retail establishment, specifically the logic engine, detects the first moment of truth of each shopper before an influential message is delivered to the wireless end device of the shopper. In some embodiments, the retail establishment assumes that the shopper is experiencing a first moment of truth when the shopper tracking device pauses for a predetermined period of time (e.g., three seconds) in front of product locations. In other embodiments, the retail establishment assumes that the shopper is experiencing a first moment of truth when the shopper tracking device slows to a predetermined pace within the store when within a predetermined ratio from the products on display. In still other embodiments, the retail establishment assumes that the shopper is experiencing a first moment of truth based on a comparison of the shopper's speed and location within the retail establishment (or shopper location data) with the shopper's shopping list and proximity of the products on display in the retail establishment that are on the shopper's shopping list.

In some embodiments, a corroboration method is used to determine if an assumed first moment of truth is in fact a false moment of truth. To be clear, the logic engine can detect a false first moment of truth when the shopper seems to be considering a product for purchase, but in fact is not considering a product for selection. For instance, with the knowledge of shopper's location tracking data signifying to the logic engine that the shopper is in the meat department and is slowing in speed, the software on the logic engine triggers a possible first moment of truth, which signals that an influential messages should be delivered. However, with additional information, such as knowledge of a "clean up" in the shopper's location (e.g., the meat department), the logic engine determines that the shopper is likely experiencing a false first moment of truth. When the logic engine determines that the assumed first moment of truth is false, the logic engine does not send the influential message to the shopper.

Corroboration of the first moment of truth can be accomplished in a number of ways. In some embodiments, software on the logic engine evaluates the shopper location data in relationship to the product selection data to reduce, or even eliminate inconsistent information and prevent the transmission of influential messages at a false first moment of truth. In other embodiments, the logic engine evaluates shopper location data in relationship to the shopping trip timing data to identify a false first moment of truth. In another embodiment, the logic engine evaluates shopper location data in relationship to the shopping trip timing data and the shopper's velocity of travel to determine if a false first moment of truth is present. After a first moment of truth is detected, and in certain embodiments is corroborated, the software on the logic engine is programmed to automatically transmit one or more influential messages, which are often product and location specific, to influence the shopper's behavior. The form of the appropriate influential message transmitted to the wireless end device can be in a form selected from the group consisting of a text message, a video, an electronic photograph, an illustration, a hyperlink, an audio message, a vibration and mixtures thereof.

Before an appropriate influential message is transmitted, it is created by the logic engine. When the shopper's unique, personal identity is known, the influential message can be tailored to the interests and past shopping behavior of the particular shopper. Since each time that a wireless end device is in close proximity of the store, the wireless end device associates with the store's communications multi-network by sending a signal to the logic engine, the retail establishment is aware of the shopper's unique, personal identity anytime the shopper shops with her wireless end device. In many embodiments, the appropriate influential message comprises information concerning a targeted product. The term "targeted product," as used herein means the product or product(s) that are the subject of the appropriate influential message generated by the logic engine from a variety of data, including, but not limited to, product location data, product selection data, product selection timing data, shopper location data, actual, real time shopper behavior data, shopping trip timing data, product location map, retail store map, retail store sales data, retail store advertisement data, competitive store advertisement data, local newspaper coupons and mixtures thereof.

The identification of the shopper occurs in various ways, usually at the beginning of each the shopping trip when the shopper begins using the wireless end device. In some embodiments, if the wireless end device is temporarily assigned to the shopper at the beginning of the shopping trip, the shopper's unique, personal identity is made known to the retail establishment at the moment the shopper scans the readable medium of an exemplary shopper's card on a product scanning device associated with her wireless end device.

In other embodiments, if the shopper enters the store with a wireless end device previously assigned to her on a permanent or semi-permanent basis, or even if the wireless end device was purchased by her, the shopper's unique, personal identity is made known to the retail establishment at the moment the wireless end device associates with the communications multi-network of the retail establishment. Where the wireless end device has been previously assigned to the shopper on a permanent or semi-permanent basis, the shopper previously scanned the readable medium of her shopper's card on the product scanning device associated with her wireless end device, thereby allowing the shopper's unique, personal identity to be identified upon initial association with the retail establishment.

An actual physical shopper's card is not necessary to identify the shopper's unique, personal identity. If shopper's cards are not utilized by the store, then the shopper's unique, personal identity information can be provided by the shopper and entered into the logic engine. The logic engine then opens an electronic file for the shopper that is associated with the unique identifying address of the wireless end device to be used by the shopper. The entry of unique, personal identity information into the logic engine can occur directly or indirectly. The entry can occur directing by the shopper. If it occurs indirectly, then the associate or the manager enters the unique, personal identity information into a computer that is communicatively coupled to the communications multi-network that then transmits the unique, personal identity information through the communications multi-network to the logic engine.

In an exemplary embodiment, an intelligent shopping cart associates with the communications multi-network by transmitting a signal to the logic engine when it is in motion. Then, the intelligent shopping cart automatically shuts down its communication with members of the communications multi-network when it is left in the same location for a certain period of time (e.g. 10 or 15 min.). Thus, the intelligent shopping cart is not associated with, and is not in tracked communication with, the logic engine when the intelligent shopping cart has not been in motion for a predetermined length of time. As with the wireless end device, the automatic shut down conserves energy when the intelligent shopping cart is not in use. Software loaded onto either the intelligent shopping cart or the logic engine permits a tolerance range to be set, allowing the store to customize the amount of time the intelligent shopping cart can be stationary before the power is reduced. In an alternative embodiment, the intelligent shopping cart is in continuous or near continuous communication with the communications multi-network, so long as it remains in close proximity to the communications multi-network.

With knowledge of the shopper's general preferences based on a category of shoppers of which the individual shopper is a member, and with the knowledge of the shopper's precise real-time location, the logic engine transmits one or more influential messages tailored to (1) the presumed or general preferences of the shopper, and (2) the precise real-time location of the shopper in the store. For example, Mariah, a 29-year-old professional African American woman who is a brand loyal shopper, begins shopping in the store with a wireless end device, which was assigned to her two years ago by the store. Mariah scanned the readable medium of her preferred shopper card two years ago when she received the wireless end device. When Mariah begins shopping in the store with her wireless end device, the wireless end device associates with the communications multi-network of the store, making the store aware of her presence in the store. The retail establishment places Mariah in a category of shoppers that share a similar shopping behavior trait, such as brand loyalty. In some embodiments, the retail establishment, through the logic engines, transmits one or more influential messages, which are tailored to the category of shoppers, to all members of the category of shoppers upon their respective entries into the retail establishment. In exemplary embodiments, the logic engine transmits influential messages tailored to the category of shoppers to all members of the category of shoppers when a first moment of truth is detected.

In other embodiments, the retail establishment categorizes shoppers based on demographics rather than past shopping behavior. In still other exemplary embodiments, the retail establishments categorize shoppers based on both previously exhibited shopper behavior and demographics. In such an embodiment, the retail establishment will tailor an influential message for all professional, African American women in the age bracket 25 to 35, who are brand loyal. In this case, Mariah will receive the same influential messages as all other known members of the category of shoppers that includes professional, African American women in the age bracket 25 to 35, who are brand loyal. For example, Mariah may receive an electronic coupon upon entry into the beauty care aisle of the retail establishment for the targeted product, Pantene® Pro-V® Relaxed & Natural® Moisturized Shampoo because she purchases Pantene® Pro-V® products and other professional, African American women in the age bracket 25 to 35, who are brand loyal buy that product as well.

Influential messages include suggestions that the shopper purchase a different size or quantity of a certain brand of detergent on which the retail establishment makes a higher profit, for example. Other potential messages to influence shoppers include suggestions to purchase additional products that other members of the category of like shoppers frequently purchase. For instance, while Mariah is in the aisle displaying laundry detergents, the retail establishment, aware of her unique, personal identity information and her location within the store, transmits to her wireless end device influential messages that suggest that Mariah purchase a 32 oz. bottle rather than a 16 oz. bottle of a fabric softener or to add a wrinkle releasing agent to her shopping cart.

In other embodiments, each shopper receives influential messages specifically tailored to her unique, personal identity information at the first moment of truth. This influential message can be in addition to or in place of influential messages tailored to the category of shoppers of which the shopper is a member. For instance, the store knows that Steve, a 59-year-old Caucasian, spends $100 every week at the store and when he purchases laundry detergent, he only purchases laundry detergents being marketed under the trademark TIDE® (3389568; The Procter and Gamble Company; laundry detergent). With this knowledge, the store may offer Steve a special offer, like five dollars off the purchase price, to purchase a targeted product, a laundry detergent marketed under the trademark CHEER® (2825038, The Procter and Gamble Company; laundry detergent) in order to entice him to switch brands. Steve benefits because he receives a discount on his detergent. The retail establishment also benefits in a number of ways including satisfying certain sales goals to keep or attract certain vendors, and potentially higher profit margins. For example, the retail establishment may have a higher profit on CHEER® than it does on TIDE®, thus when Steve buys CHEER® and potentially switches brands, the retail establishment experiences higher profit margins.

The retail establishment learns the shopper's personal preferences in a variety of ways. For example, the retail establishment can have the shopper fill out surveys about store conditions, preferred products, and suggestions on how to improve the shopping experience. Surveys can be filled out either on paper or electronically in the retail establishment or at home. The retail establishment can also learn the shopper's personal preferences from reviewing each shopper's shopping history with the retail establishment. Retail establishments additionally have access to shopper generated shopping lists, since the system provides for shopping lists to be created and shared with retail establishments in a number of ways. Shoppers can scan products' readable media as the shoppers use up products in their homes using product scanning devices associated with wireless end devices that they have taken home. Alternatively, the shopping list can be created electronically by the shopper on a retail establishment owned or monitored website that then communicates the shopping list to the logic engine of the retail establishment in which the shopper shops.

In exemplary embodiments, the logic engine is aware of a variety of information that includes, but is not limited to the following: (1) demographic information collected from shoppers when they obtain preferred shopping cards; (2) the purchasing history associated with an exemplary shopping cards; (3) historical progression; (4) information collected from shopper surveys; and (5) shopping lists and/or inventory lists created by shoppers at non-store locations (such as their homes) on their personal computers or wireless end device. A significant amount of shopper information known by the retail establishment is created by the shopper at non-store locations. Much of this shopper information is contributed by the shopper while she is at home through the wireless end device assigned to the shopper on a permanent or semi-permanent basis, or through the Internet. Retail establishments with access to this plethora of shopper information created at non-store locations use the shopper information to influence shoppers by tailoring influential messages or by selecting the appropriate pre-made influential messages to use on shoppers during their next shopping trip.

It is advantageous to both retail establishments and shoppers for retail establishments to have access to shoppers' shopping lists, because retail establishments can suggest additional items to be purchased that either (1) complement the shopper's shopping list to provide a complete menu, or (2) complete a recipe. For instance, in the event the shopper has on her shopping list hotdogs and buns, the retail establishment transmits an influential message, suggesting that the shopper consider purchasing ketchup, mustard, and relish, to the wireless end devices used by the shopper when the shopper is in the condiments aisle. Alternatively, the retail establishment can suggest the shopper use a recipe that can be created with the purchase of just a few additional ingredients. For example, when the retail establishment is aware that the shopper has chips and salsa on his shopping list, the retail establishment can transmit an influential message suggesting that the shopper additionally purchase cheese to make nachos.

With knowledge of the shopper's inventory list in combination with the knowledge that the shopper is in a certain department of the retail establishment, the retail establishment can send the shopper an influential message just before or just as the shopper starts to leave that department. Thus, in some embodiments, the logic engine may generate an appropriate influential message that comprises targeted product information concerning a targeted product that is located in an aisle proximate or distant to the shopper location data collected by the logic engine. This appropriate influential message can be based on previous product selection data. Thus, in some embodiments, the logic engine may generate an appropriate influential message that comprises targeted product information concerning a targeted product that is generated from the product selection location data of the shopper wherein the targeted product is located in an aisle proximate to the shopper location data collected by the logic engine. For example, the retail establishment can send a reminder to the shopper to not forget certain products for sale in that particular department that are not on the shopper's inventory list.

Just as shoppers vary from one to another, so too does the content of the influential messages. The content of the influential messages includes, but is not limited to the following: the form of recipe suggestions; suggested entries for the shopper's shopping list; e-coupons; targeted pricing of an item, which is similar to a coupon yet may better reflect the supply and demand relationship between the retail environment and its customer; alerts when a shopper has passed a product on her shopping list; discounts; product reviews; competitive product offers; enhanced saving opportunities (e.g., a potential system alert could be the following: "We see that you have selected five two liters of soft drinks, purchase five more and receive $2.00 off"); co-branding opportunities (e.g., "We see that you have selected COCA COLA®, a mark registered to The Coca-Cola Company for soft drinks, why not try some LAY'S®, a mark registered to Recot, Inc. for potato crisps, along with your COCA COLA®?"); responses to historical progression of product selection; general product warnings (e.g., "This product contains iron" or "This is a dairy product"); product warnings tailored to shopper profile (e.g., a shopper's profile includes allergen data that someone in the shopper's family is allergic to peanuts, thus the influential message may be "The product you just selected was produced in a factory that handles peanuts."); combination product warnings (e.g., "We see that you purchased a prescription medication last week that may conflict with the prescription medication that you have ordered for pick-up today, please consult your physician before taking two prescription medications."); health awareness alerts that provide specific product information such as sodium content or fat content; product and store surveys; internal maps on how to find products within the retail establishment; and other influential messages known in the art. Furthermore, influential messages can be varied in the type of media employed, such as text messages, electronic photographs, illustrations, videos, audio, hyperlinks, and interactive messages.

In addition to these methods of tailoring the influential messages to the shopper's product consideration, the logic engine tailors the influential messages using information that includes but is not limited to the following: (1) the time and date the shopper is in the retail establishment; (2) the shopper's general preferences already known to the retail establishment; (3) the shopper's personal preferences already known to the retail establishment; (4) the shopper's previous purchases; (5) the shopper's real time intended purchases known to the store through organization by the logic engine of product scanning data and shopper location data; (6) the shopper's shopping list; (7) the shopper's home inventory list; (8) the actual time period the shopper spends considering purchasing a particular product or class of products; (9) the amount of money that the shopper chooses to spend on any one or several items according to the shopper's inputted budget for one or more items; (10) the promotional prices (advertised or otherwise) currently in the retail establishment; (11) the shopper's previously staged electronic coupons or previously scanned paper coupons; (12) the shopper's requests for "health alerts" (ex: allergens) in her profile; and (13) the shopper's request for alerts to marked down individual packages due to close expiration dates for categories that they intend to purchase. The above list is by no means exhaustive and additions to the list can be readily made.

Ideally, the system provides an appropriate influential message that then influences the shopper's product selection and the shopper follows through with the purchase of targeted products.

Such influencing includes, but is not limited to, adding more products to those chosen or considered, exchanging a product chosen or considered for one suggested by the system, and/or removing a chosen product due to some known allergic or chemical reaction by the shopper or members of a shopper's household. Each of the reactions can be measured by the logic engines when the actual, real-time shopper behavior data is known. However, even if the influential messages do not influence the shopper's product selection, the retail establishment is aware of the shopper's decision not to follow the suggestion of the retail establishment and can retain that information specific to the shopper for later analysis and review of the reasons as why the product was not selected. The retail establishment can analyze which types of influential messages are most effective and even what displays in the retail establishment influenced or did not influence the shopper to choose or not choose products. This information provides retail establishments with the opportunity to tailor future influential messages to be superior to all other types of the influential messages.

In contrast, there are embodiments wherein the influential messages are not tailored to the individual by the logic engine, but instead are selected from a variety of already prepared influential messages. In this event, the system selects the most influential of the already prepared influential messages, based upon the actual, real-time shopper behavior data. Other embodiments employ a mixture of both tailored and pre-made influential messages.

In an exemplary embodiment, shoppers "opt in" to the types of influential messages they want to receive. For instance, some shoppers will want health awareness alerts, while others would rather receive more information on product pricing, saving opportunities, promotions, etc. Examples of the types of influential messages are described in turn below.

As briefly discussed above, in some embodiments, the retail establishment influences shopper behavior by suggesting the shopper make certain recipes. When the retail establishment suggests the purchase of certain items to complete a recipe, the retail establishment is aware of certain shopper information such as the shopper's shopping list, the shopper's home inventory list, or the shopper's already scanned selected items for purchase during the shopping trip. The term "recipe" as used herein includes projects, which requires items to be purchased and assembled in some fashion to achieve the desired result, much like a recipe. For instance, when a hardware store is aware that the shopper is purchasing house paint and brushes, in an exemplary embodiment, the hardware store suggests in an influential message that the shopper purchase sea sponges and glaze, so that the shopper can complete a faux finish painting project.

In another embodiment, the influential message provides shoppers the best routes to travel while shopping in the retail establishment, using the shopper's known shopping list. The retail establishment will provide either maps or directions to find all of the items on the shopper's shopping list. Thus, in some embodiments, the logic engine may generate an appropriate influential message that comprises targeted product information concerning a targeted product that is located in an aisle or location that is distant to the shopper location data collected by the logic engine. Exemplary embodiments provide shoppers with shopping routes tailored to real-time events within the retail establishment. As well, in other exemplary embodiments, the appropriate influential message can lead the shopper away from a high traffic area to a targeted product that garners a higher profit margin for the store, for example, seasonal items.

These embodiments allow stores to utilize the location, timing, and personal information of each shopper to tailor influential messages to the product the shopper is considering purchasing. Furthermore, the influential messages are transmitted through the communications multi-network to the wireless end device at the time the shopper is actually considering selecting the product for purchase. This could be at, during, or just after a first moment of truth.

FIG. 1 provides a schematic plan view of retail establishment 5. In particular, a top view of a section of retail establishment 5 in which shopper 7, associate 8, and manager 9 is positioned and associated within communications multi-network 10 for wireless communication between members of the communications multi-network 10 is shown. Communications multi-network 10 is positioned within and about retail establishment 5 and the store's premises (e.g., the store's parking lot and other outer areas—not shown).

The communications multi-network 10 in FIG. 1 comprises a mesh communication network 14 and a star communication network 16. However, the make-up of the communications multi-network varies depending on the specific application contemplated. In some embodiments, the communications multi-network 10 includes at least one mesh communication network and at least one star communication network. Through the wireless end device, the shopper 7 communicates data, including machine readable messages and location information to the logic engine through the communications multi-network. In exemplary embodiments, human readable messages and machine readable information, such as barcodes, are communicated through the star communication network 16 of the communications multi-network 10 while the operator's X and Y positional coordinates are tracked through the mesh communication network 14 of the communications multi-network 10.

Shopper 7, associate 8, and manager 9 are each connected through multi-network communication lines 6 and multi-network router 11 to both mesh communication network 14 and star communication network 16 of communications multi-network 10. FIG. 1 shows an embodiment in which multi-network routers 11 operate for both the mesh communication network 14 and the star communication network 16. Each multi-network router 11 contains the components for transmission of data through mesh communication network 14 and star communication network 16, allowing it to operate as a radio for mesh communication network 14 or star communication network 16.

In selected embodiments, each multi-network router 11 is placed in a location that is out of reach of persons shopping or working in retail establishment 5. For example, in FIG. 1, each multi-network router 11 is close to or in the ceiling of retail establishment 5. In some embodiments, each multi-network router 11 can house at least three radios: a first radio functioning as an information router of mesh communication network 14, and at least two more radios functioning as a data communication radio of the star communication network 16. In exemplary embodiments, in addition to the three radios, each multi-network router 11 comprises a computer component complete with its own IEEE address; the computer component allows the information collected by any of the radios to be transmitted over cable wires, shown herein as system communication lines 19, to the logic engine 23.

In the embodiments utilizing a communications multi-network 10, each multi-network router 11 contains all necessary components to operate for both mesh communication network 14 and star communication network 16. Multi-network router 11 comprises at least three microcontroller units (MCUs). One MCU is used for mesh communication network 14 and at least two are used for star communication network 16. Each MCU may be a system-on-a-chip type of MCU and comprises a control unit, one or more registers, an amount of ROM, an amount of RAM and an arithmetic logic unit (ALU).

The Texas Instruments CC2431 MCU is an exemplary MCU for use as one of the radios for the mesh communication network 14 and for one of the at least two radios used on the star communication network 16, because of its ability to readily transmit data through mesh communication network 14 and star communication network 16 at prescribed data transmission rates. Also, the Texas Instruments CC2431 MCU can provide location detection functions within communications multi-network 10 herein. Alternatively, the Texas Instruments CC2430 MCU is an exemplary MCU for use as one of the radios for mesh communication network 14 and for one of two radios used on star communication network 16. The third radio of the at least three radios of multi-network router 11 should be a more powerful radio than those of the Texas Instruments CC243x series.

As shown in FIG. 1, the multi-network organizer 21 operates as both a hub for the star communication network 16 and as a mesh network organizer for the mesh communication network 14. While the radios for the mesh communication network 14 and the star communication network 16 are shown herein as housed in the same device, they could be housed in separate units depending on the specific application contemplated. Every mesh communication network 14 needs a mesh network organizer. In the embodiment shown in FIG. 1, the mesh network organizer is referred to as multi-network organizer 21 because it is housed with a data communication radio. In other embodiments, the mesh network organizer could be in a standalone unit without a data communication radio.

Referring to FIG. 1, system communication lines 19 are shown connecting each multi-network router 11 to the logic engine 23. System communication lines 19 can be either wireless or wired, and are depicted as solid lines to indicate that they are wired in FIGS. 1, 2B, 3A, 3B, and 4. Ethernet cable is an exemplary wired connection device between each multi-network router 11 and logic engine 23. The system communication lines 19 shown in the Figures are merely exemplary, as system communication lines 19 connect from every multi-network router 11 and multi-network organizer 21 to logic engine 23. In exemplary embodiments, the system communication lines 19 connect multi-network routers 11 to one another.

Also shown in FIG. 1 are multi-network communication lines 6 that correspond to zones of transmission between multi-network routers 11 within mesh communication network 14. In practice, multi-network communication lines 6, though represented as straight lines for purposes of illustration, are not necessarily straight lines, but more accurately are circular zones of transmission emanating from each multi-network router 11. Through such zones of each multi-network router 11, data is transmitted and received.

Figure 7:
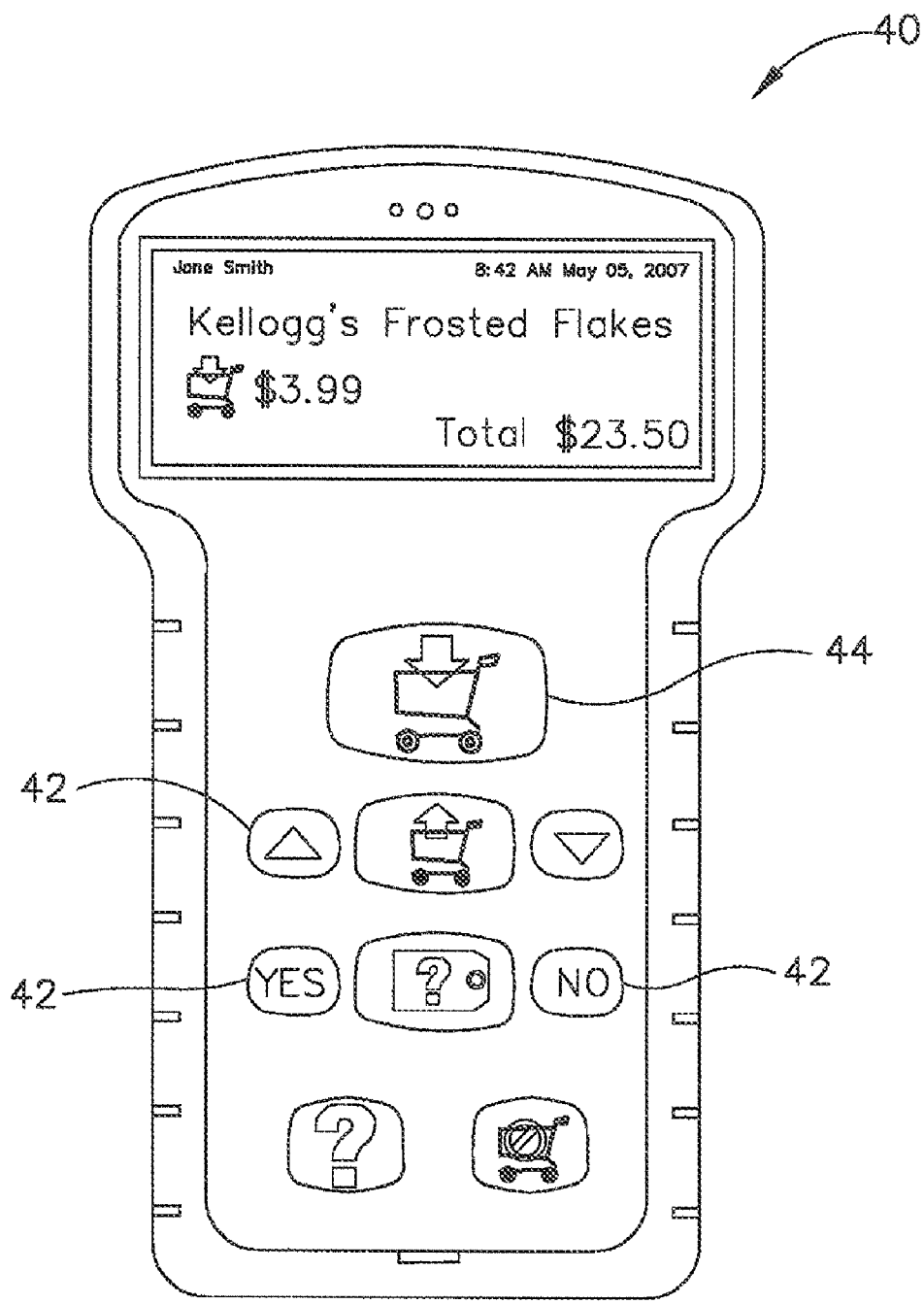
FIG. 7 provides a schematic frontal view of a wireless end device used by a manager, an associate, or a shopper.

In practice, the data transmission rate within mesh communication network 14 can be configured to be at least 125 kilobytes per second (KB/s). The data transmission rate within star communication network 16 can be configured to be at least 250 KB/s. The interface between shopper 7 and communications multi-network 10 is wireless and is accessed by shopper 7 through either or both of the following: a wireless end device 40 (as shown in FIG. 7), and an intelligent shopping cart 50 (as shown in FIG. 8) over multi-network communication lines 6.

Figure 2A:
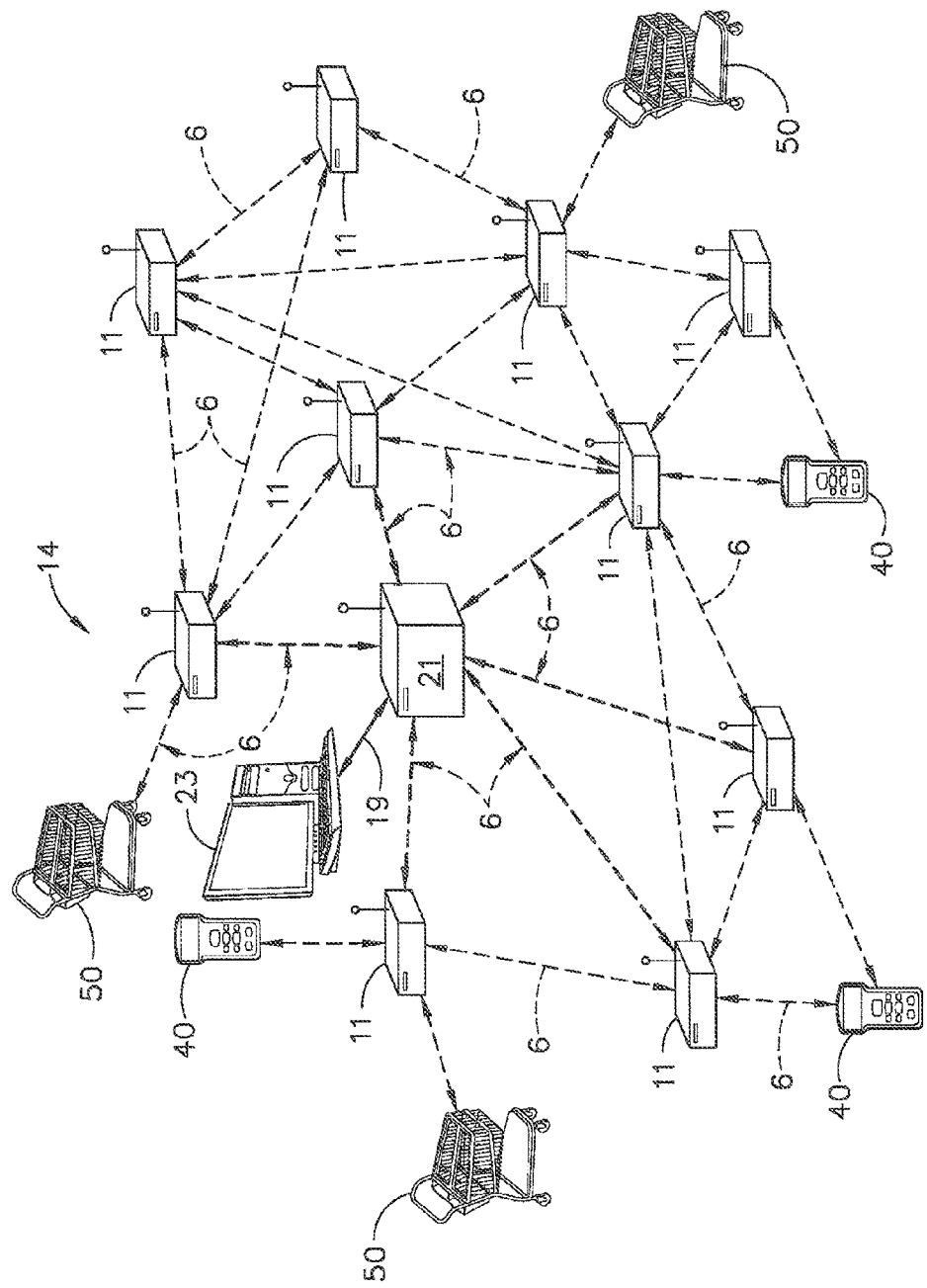
FIGS. 2A and 2B is a schematic plan view of an exemplary mesh communication network useful in a store

Referring now to FIG. 2A, a schematic representation of an exemplary mesh communication network 14 is provided. Multiple multi-network routers 11 are in wireless communication with members of the mesh communication network 14 via multi-network communication lines 6. Members of the mesh communication network 14 can include wireless end devices 40, intelligent shopping carts 50, and a multi-network organizer 21 which operates as the mesh network organizer (shown housed with a data communication radio). Multi-network communication lines 6 depicted as dashed lines in order to show the direction and existence of wireless lines of communication between the information routers that make up mesh communication network 14 and other components (e.g. the wireless end devices 40 and multi-network organizer 21). Mesh communication network 14 provides many benefits including low power consumption, low cost of operation, efficient communication within a defined space and low cost for maintenance.

As shown in FIG. 2A, each multi-network router 11 has the ability to communicate with at least some of the other multi-network routers 11 in the mesh communication network 14. In some embodiments, each multi-network router 11 is able to communicate with every other multi-network router 11, the multi-network organizer 21, or wireless end device 40 associated with the mesh communication network 14.

Mesh communication network 14 is a local area network (LAN) that employs one of two connection arrangements. One arrangement is a full mesh topology wherein all of the multi-network routers 11 are wirelessly connected to one another and can receive and transmit information to every other multi-network router 11 within the mesh. Another exemplary arrangement is a partial mesh topology. In a partial mesh topology, each multi-network router 11 is wirelessly connected to some, but not all, of the multi-network routers 11 available within the mesh. Mesh communication network 14 shown in FIG. 2A is the full mesh topology type.

In some embodiments, the data transferred through mesh communication network 14 is limited to small packets of data, such as X and Y positional coordinates between shoppers 7, associates 8, and managers 9. In some embodiments, the location tracking subsystem is conducted over the mesh communication network 14. In this embodiment, the functionality of the location tracking subsystem uses the information router component of the multi-network router 11. In this embodiment, information routers do not necessarily communicate with each other, but instead provide X and Y positional coordinates to each blind node, which could be a wireless end device 40 or an intelligent shopping cart 50. In selected exemplary embodiments, the wireless end device 40 calculates its own X and Y position through triangulation software loaded onto the wireless end device 40. The wireless end devices 40 receive signals from at least three of the information routers, shown in FIG. 2A as comprised within the multi-network router 11, in order to triangulate the position of the wireless end device 40 or the intelligent shopping cart 50. The multi-network routers 11 are each aware of their X and Y positional coordinates because the logic engine provides each multi-network router with their X and Y positional coordinates. Multi-network routers 11 are connected to the mesh network organizer, shown as multi-network organizer 21, which is connected to the logic engine 23 (shown in FIGS. 1, 2B, and 3A) through an Ethernet cable (system communication line 19 in FIGS. 1, 2B, 3A, 3B, and 4).

In some embodiments, mesh communication network 14 is a ZIGBEE communication network. ZIGBEE is the name of a specification for a suite of high level communication protocols using small, low power digital radios based on the IEEE 802.15.4 standard for wireless personal area networks (WPANs). ZIGBEE is targeted at radio frequency (RF) applications that require a low data rate, long battery life and secure networking.

Referring back to FIG. 2A, in its simplest form, mesh communication network 14 includes one or more multi-network routers 11, at least one multi-network organizer 21, and wireless end devices 40. The multi-network organizer 21 is a device that routes data through one or more of multi-network routers 11 within mesh communication network 14. The multi-network organizer 21 is connected to the logic engine 23 through a system communications line 19. The mesh communication network 14 is either of the beacon or the non-beacon type. In beaconing networks, power use is further minimized because multi-network router 11 only needs to be active while a beacon is being transmitted. Power consumption in non-beacon type networks can be higher since at least some of multi-network routers 11 within communications multi-network 10 are always active, while some others may be inactive. It is possible, though, to have all or substantially all multi-network routers 11 within the communications multi-network 10 continuously active.

In the embodiments where the mesh communication network 14 is a beaconing network, the multi-network routers 11 (and more specifically, the radios for the mesh communication network called the information routers) automatically broadcast multiple times per second their X and Y positional coordinates out to the blind nodes. Blind nodes are selected from the group consisting of wireless end devices 40 and intelligent shopping carts 50. In this embodiment, blind nodes do not have to transmit signals to the multi-network routers 11 asking for their coordinates.

Other embodiments employ a non-beacon type mesh communication network 14. In a non-beacon enabled network (i.e., those whose beacon order is 15), multi-network routers 11 have data receivers that can be continuously active. In these embodiments, when asked by wireless end devices 40, mesh network organizer transmits a signal through the one or more multi-network routers 11 back to the blind nodes. Multi-network organizer 21 manages multi-network routers 11, causes association of wireless end devices 40 to the mesh communication network 14, stores information received from multi-network routers 11, and routes messages between multi-network routers 11 and wireless end devices 40 or intelligent shopping carts as 50. The use of a non-beacon type of mesh communication network 14 additionally allows for heterogeneous networks of multiple device types in which some devices receive continuously, while others only transmit when an external stimulus is detected.

One example of an element within a heterogeneous network is a lamp having a wireless light switch. The node at the lamp receives constantly, since it is connected to the lamp's power supply while a battery-powered light switch remains "asleep" or inactive until the light switch is thrown. The light switch then activates, sends a command to the lamp, receives an acknowledgment, and returns to a state of inactivation. In a beacon type network, multi-network routers 11 within mesh communication network 14 transmit periodic beacons to confirm their presence to other network nodes. Such nodes sleep between beacons, thus lowering their duty cycle and extending their battery life.

Logic engine 23 or, in alternative embodiments, location tracking server 31, provides several important functions within mesh communication network 14. Important functions provided by the logic engine 23 are those of computation, information storage, organization, response, network notification, data prioritization, event prioritization, ray tracing calculations, creation of historical progressions, creation of heat maps, and others. The logic engine organizes product selection data with shopper location data collected within a predetermined period of time from the wireless end device to create product selection location data. The logic engine also organizes all product selection location data from a single shopping trip to create collective product selection location data, storing each shopper's collective product selection location data in a shopper's electronic profile. This shopper's electronic profile enables the retail establishment to further analyze trends, using the logic engine to create historical progressions for the shopper, either individually or by category. At least one server-grade computer or server is preferred. A server is particularly useful in communications multi-network 10 herein because of its large computational and storage capacities.

Figure 2B:
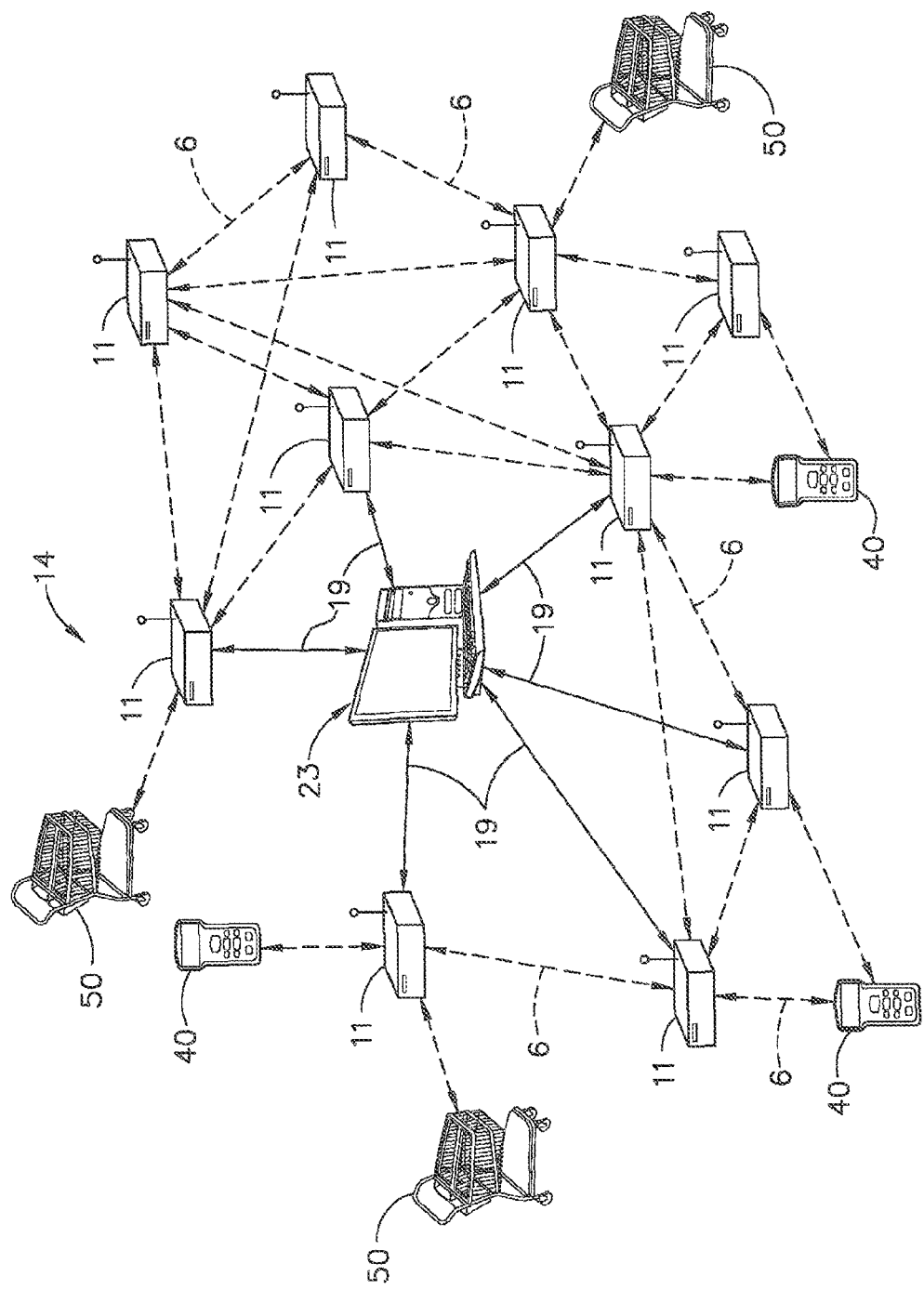

Referring now to FIG. 2B, a schematic representation of the functionality of an exemplary mesh communication network 14 is provided. The mesh communication network 14 transfers data between the members of the mesh communication network 14 such as multi-network routers 11 and wireless end devices 40 to the logic engine 23 through mesh communication lines 6. FIG. 2B shows that there is a dataflow between the logic engine 23 and the wireless end devices 40 and between the logic engine 23 and the intelligent shopping carts 50.

Figure 3A:
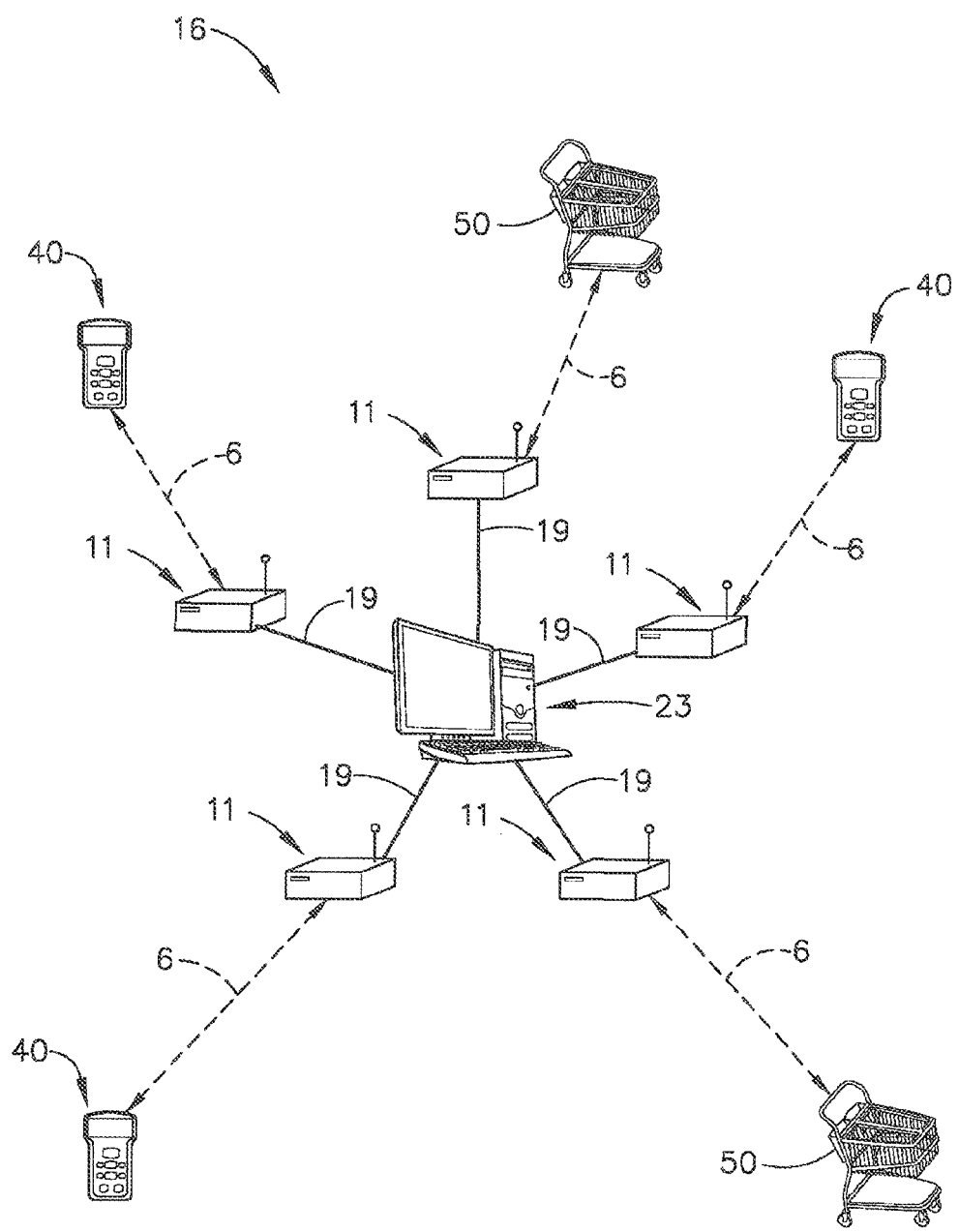
FIGS. 3A and 3B is a schematic plan view of an exemplary star communication network useful in a store.

FIG. 3A provides an exemplary representation of a star communication network 16. In FIG. 3A, data communication radios (housed with multi-network routers 11 in FIGS. 3A and 3B), communicate directly with logic engine 23 along system communication lines 19. System communication lines 19 can be wired lines that connect the multi-network routers 11 to logic engine 23. For the purposes of explaining the functionality of the star communication network 16, multi-network communication lines 6 are wireless lines of communication between multi-network routers 11 and wireless end devices 40, and are thus depicted as dashed lines. In some embodiments, system communication lines 19 are capable of transferring with high quality and at high speeds digital transmission of voice and other large amounts of data.

A star communication network 16 is particularly useful and important to communications multi-network 10. With its data transmission rate of 250 KB/s or more, star communication network 16 carries data streams that require higher data transmission rates for speed and efficiency. Voice data, pictures, video, and financial transaction data, for example, are data types best suited for transmission at a higher (e.g., 250 KB/s or greater) transmission rate. While these types of information or data can be transmitted through mesh communication network 14, a star communication network 16, either in place of or in addition to mesh communication network 14, can be utilized.

An exemplary star communication network 16 herein operates within the IEEE 802 communications protocol. IEEE 802 refers to a family of IEEE standards dealing with local area networks and metropolitan area networks. More specifically, the IEEE 802 standards are restricted to networks carrying variable-size data packets. In contrast, in cell-based networks, data is transmitted in short, uniformly sized units called cells for use within, for example, cell phones. Is acknowledged that star communication networks 16 operate within multiple communication protocols including, but not limited to, BLUETOOTH® (telecommunications equipment for a protocol of IEEE 802.15.1 and 802.15.2 registered to Bluetooth Sig, Inc.), WIMEDIA® (specifications for the connection of wireless multimedia devices, commonly known as the IEEE 802.15.3 protocol, which is registered to WiMedia Alliance Corporation), Wi-Fi (IEEE 802.11b), Wi-Fi5 (IEEE 802.11a/HL2), and other wireless protocols like protocol 802.15.4 as noted hereinabove.

In an exemplary embodiment, within IEEE 802, star communication network 16 transmits data within the IEEE 802.15.4 communications protocol. The IEEE 802.15.4 protocol controls transmissions sent through wireless personal area networks (WPANs). WPANs can include the use of BLUETOOTH technology. The IEEE 802.15.4 communications protocol has a low data rate (e.g., about 125 KB/s) and also allows for a long battery life (e.g., battery life for months or even years) in multi-network routers 11 and is known for its very low technical complexity and low power requirements.

Figure 3B:
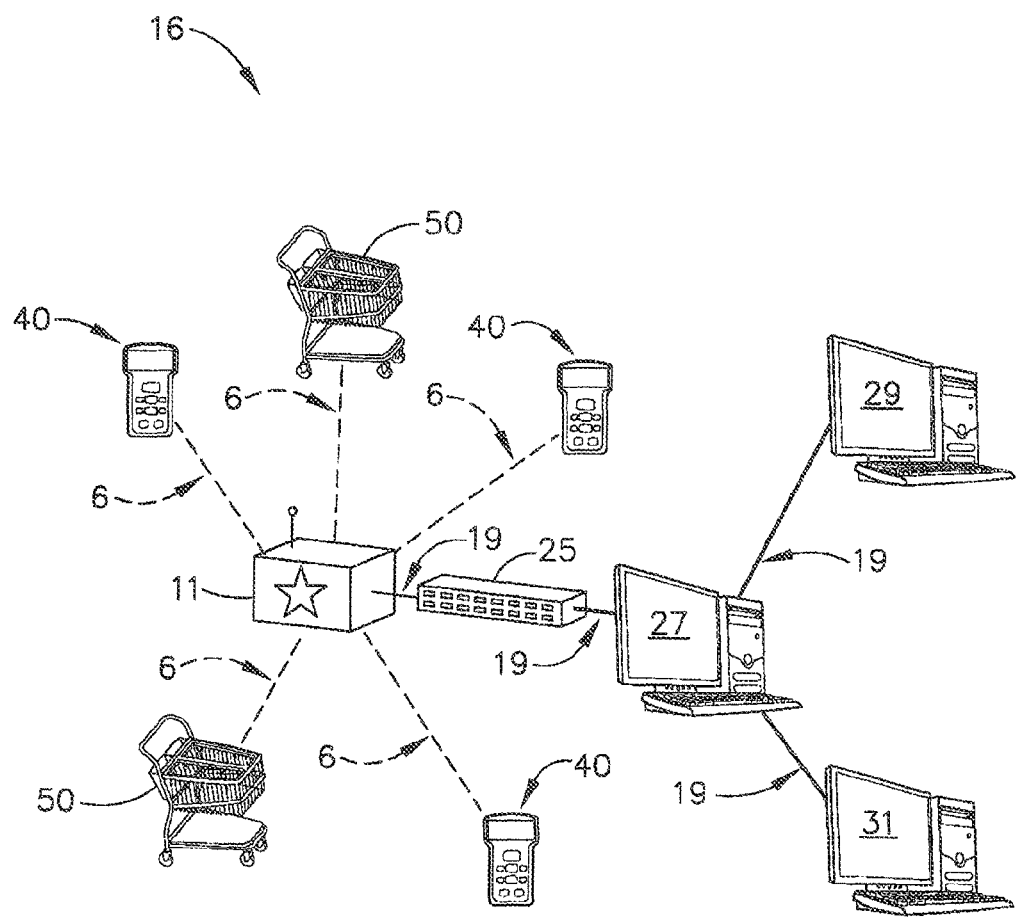

Referring now to FIG. 3B, an exemplary representation of a star communication network 16 is provided. In this embodiment, all substantive communication with the wireless end devices 40 and the intelligent shopping carts 50 is conducted through star communication lines (shown here as multi-network communication lines 6), the data communication radio housed in the multi-network router 11, switch 25 and gateway server 27, and appropriate store server, such as the location tracking server 31. Communication between multi-network router 11 and switch 25 takes place through system communication lines 19, which are either wired or wireless, depending on the specific application contemplated. In some embodiments of the system, system communication lines 19 are wired while multi-network communication lines 6 are wireless. In alternative embodiments, switch 25, gateway server 27, and store servers 29 and the location tracking server 31 are replaced with logic engine 23 (not shown in FIG. 3B).

Figure 4:
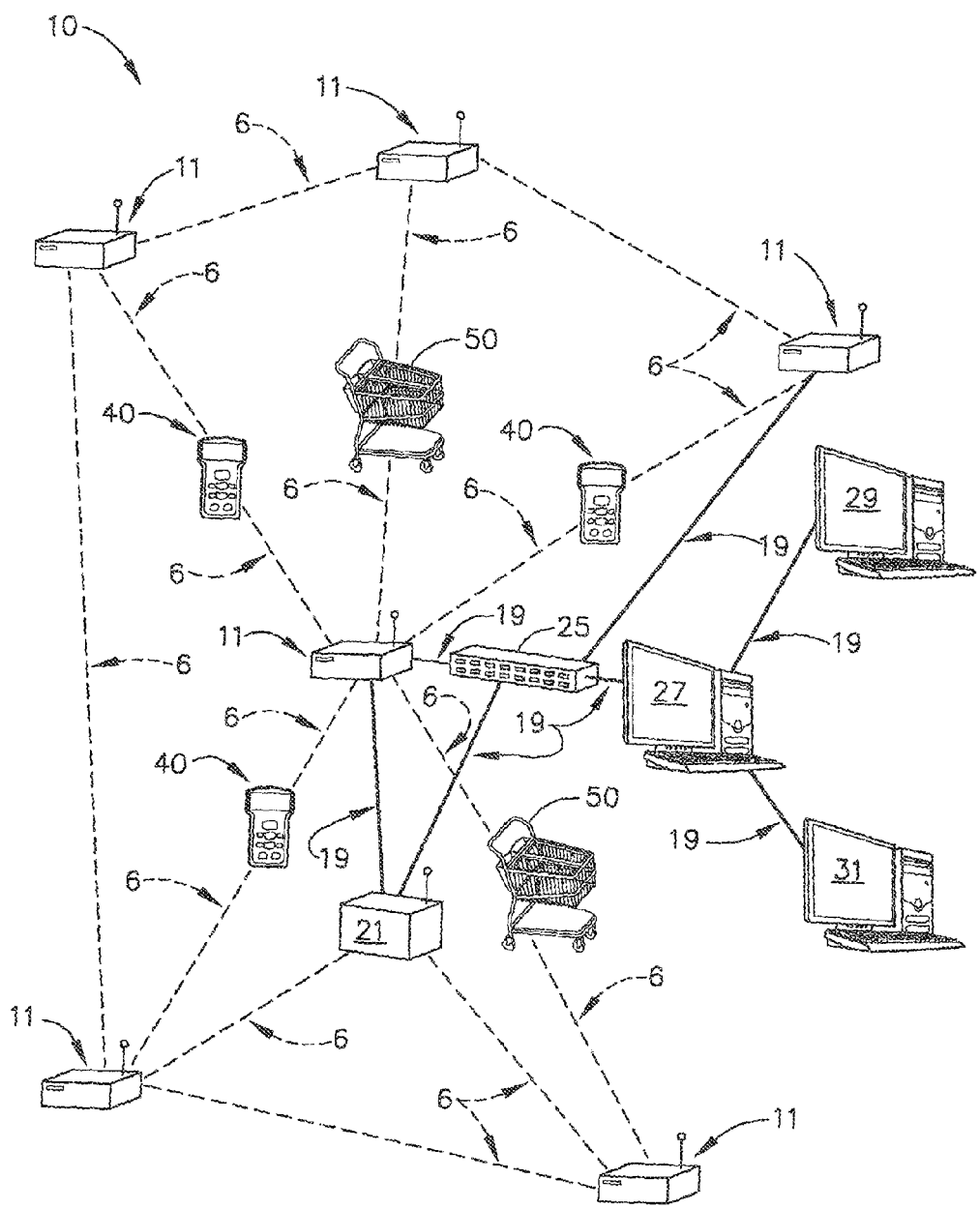
FIG. 4 provides a schematic view of a store providing an exemplary communications multi-network with one star communication network and one mesh communication network useful in a store.

FIG. 4 provides an exemplary representation of a communications multi-network 10. In FIG. 4, multi-network routers 11 provide a signal to wireless end device 40. In an exemplary embodiment, multi-network routers 11 provide wireless end device 40 with the X and Y positional coordinates of multi-network information routers 11. Wireless end device 40 or intelligent shopping cart 50 either performs the calculations necessary to provide its own location in X and Y positional coordinates, or sends a signal out through star communication network 16 to the location tracking server 31. The location tracking server 31 performs the ray tracing and location tracking calculations in some embodiments. In exemplary embodiments, the logic engine 23 performs the location tracking calculations. Under any of the above described embodiments, the location of each wireless end device 40 and intelligent shopping cart 50 is known to the store through the data exchanged between wireless end device 40 and the radio of the information router of the multi-network router 11 of mesh communication network 14.

In embodiments where wireless end device 40 is a reduced function device and either the logic engine 23 or the location tracking server 31 performs the location tracking computations, the radio of the information router in the nearest multi-network router 11 provides the wireless end device 40 with its own X and Y positional coordinates. The radio of the information router in the multi-network router 11 nearest the wireless end device 40 receives the X and Y positional coordinates of wireless end device 40 from the multi-network organizer 21, which receives the X and Y positional coordinates from the location tracking server 31. In any event, the location of wireless end device 40 on the map of retail establishment 5 (shown in FIG. 1) is known to both wireless end device 40 and either the location tracking server 31, or the logic engine 23, through the mesh communication network 14 of communications multi-network 10.

In an exemplary embodiment, with the location of each wireless end device 40 known, wireless end device 40 held by the shopper 7 sends information to and receives information from store associates 8 and managers 9 through star communication network 16. In certain embodiments, the location of each intelligent shopping cart 50 is known, and the intelligent shopping cart 50 used by the shopper 7 sends information to and receives information from associates 8, managers 9, or logic engine 23 through star communication network 16. In some embodiments, all communication between shopper 7 and at least one of the group consisting of associates 8, managers 9, and an intelligent shopping cart 50 must be conducted through multi-network router 11, switch 25 and gateway server 27, and the appropriate store server, such as the location tracking server 31.

Figure 5:
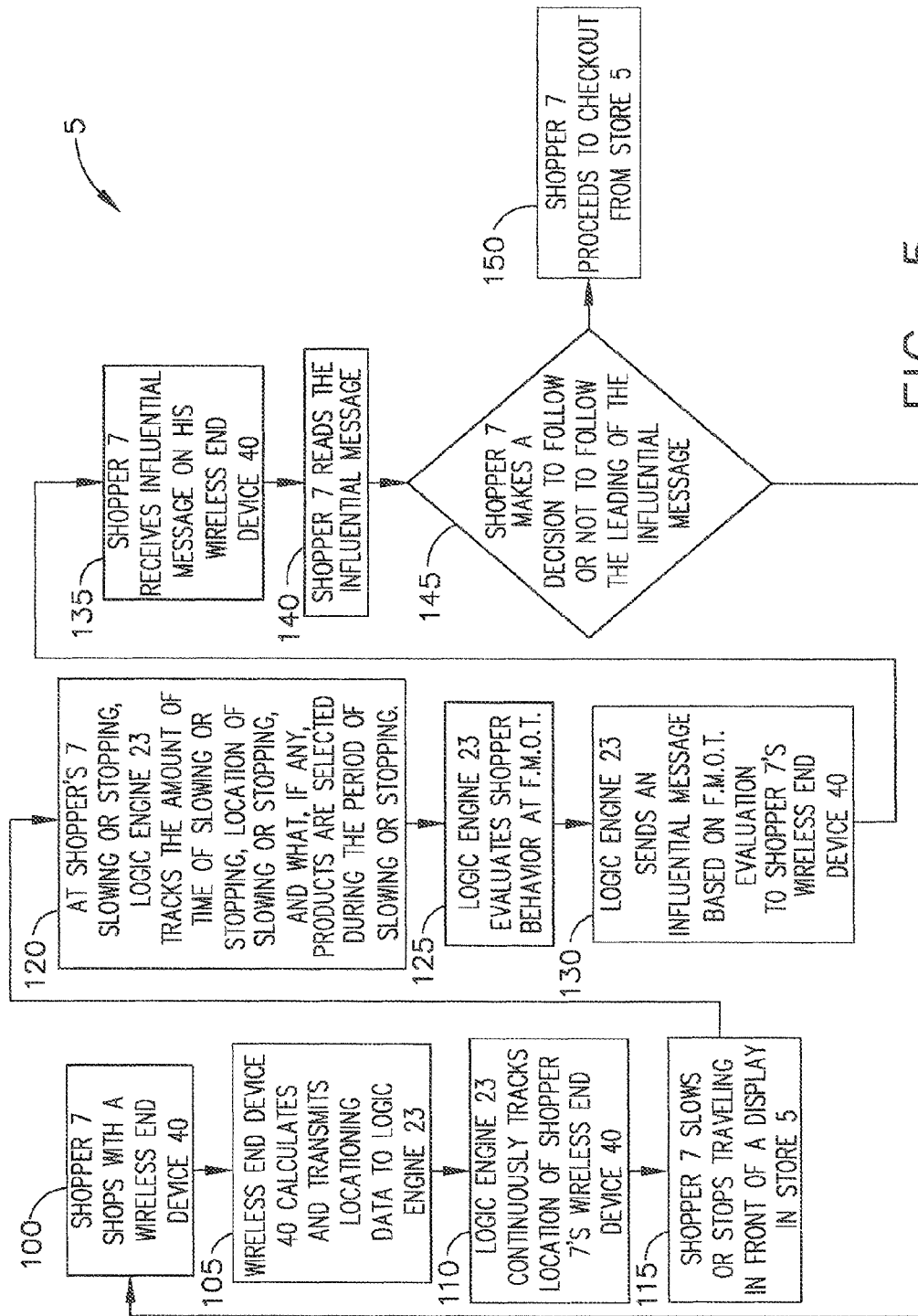
FIG. 5 provides a flowchart of an embodiment of the system and method for calculating, storing and keeping track of the location of the presumed location of a shopper with the store.

In FIG. 5, a flowchart of an exemplary embodiment of the system and method for influencing shopper 7 at the first moment of truth is provided. Generally, the shopper is influenced by messages transmitted to shopper 7's wireless end device 40 through the communications multi-network 10 in retail establishment 5. In Step 100 of FIG. 5, the shopper 7 begins shopping with the wireless end device 40. In most embodiments, when the shopper 7 begins shopping with the wireless end device 40, the shopper 7 scans her preferred shopper card when the wireless end device 40 is assigned to the shopper 7, making retail establishment 5 immediately aware of shopper 7's identity. In Step 105, wireless end device 40, which is held in close proximity to shopper 7 as she shops, continuously calculates and transmits location data to logic engine 23. Logic engine 23 receives location data from shopper 7's wireless end device 40. In embodiments where wireless end device 40 is a reduced function device, the coordinates of the closest multi-network routers 11 will be transmitted from wireless end device 40 to logic engine 23 where the location data will be calculated by logic engine 23.

Step 110 shows that logic engine 23 continuously tracks the location of wireless end device 40 held in close proximity to shopper 7. The use of the word "continuously" as used herein is defined as the increment determined by the software operator. For instance, the interval of time can be, but is not limited to, every 3 seconds, every 5 seconds, or every 10 seconds. The interval will vary, depending on the specific application contemplated.

Then, as shown in Step 115, shopper 7 slows or stops traveling through the store in front of products and experiences a first moment of truth. Logic engine 23 is programmed with software that recognizes when shopper 7 is experiencing a first moment of truth when shopper's speed slows to a certain speed or when the shopper 7 stops in front of a display for a certain period of time, e.g. three seconds. At Step 120, when shopper 7 slows or stops her travel through the retail establishment 5 in front of products, logic engine 23 tracks the amount of time the shopper 7 slows or stops, the location of the slowing or stopping, and the identity of the products selected by shopper (if any are selected at all) during the period of the slowing or the stopping of travel throughout retail establishment 5.

In Step 125, logic engine 23 evaluates the information collected during step 120 to determine whether shopper 7 is experiencing a first moment of truth. To determine a first moment of truth, the logic engine 23 compares the tracked location of the shopper 7 (also known as shopper location data) to the product location map to produce a shopper to product location ratio. When the product to location ratio is within about five feet, the logic engine 23 begins timing the amount of time that the shopper 7 is in close proximity to the product. When shopper 7 selects the product and scans it with her wireless scanning device, creating product selection data, the logic engine 23 stops timing using the difference between the time of day when the shopper 7 selected the product and the first moment the product location ratio was under about five feet. The logic engine 23 evaluates the intended product purchase of the shopper, the shopper to product location ratio, and the product selection timing data to produce an evaluation data. The logic engine determines if the evaluation data indicates a first moment of truth.

In Step 130, if it is determined that the shopper 7 is experiencing a first moment of truth based upon the evaluation data, then logic engine 23 transmits to shopper 7, via her wireless end device 40, an appropriate influential message based on the first moment of truth evaluation. In Step 135, shopper 7 receives the influential message on her wireless end device 40. Ideally, while experiencing a first moment of truth, shopper 7 reads the influential message on her wireless end device 40 as shown in Step 140. Non-ideally, shopper 7 can read the one or more influential messages on this wireless end device 40 when not experiencing a first moment of truth.

At this point in time, in Step 145, shopper 7 makes a decision either to follow or not to follow the leading of the influential message. For instance, when the influential message recommends a substitute product for the one scanned by shopper, at Step 145 shopper 7 decides to purchase the item the influential message recommended. In other embodiments, the shopper 7 is influenced by the influential message to purchase a different quantity of products than shopper 7 originally contemplated at her first moment of truth. In still other embodiments, the shopper 7 decides to purchase a different product than the product selected and scanned, returning the original product to the shelf and scanning the suggested product. After shopper's decision in Step 145, shopper 7 either continues to shop (returning to Step 100) or proceeds to check out the items already selected (Step 150).

Figure 6:
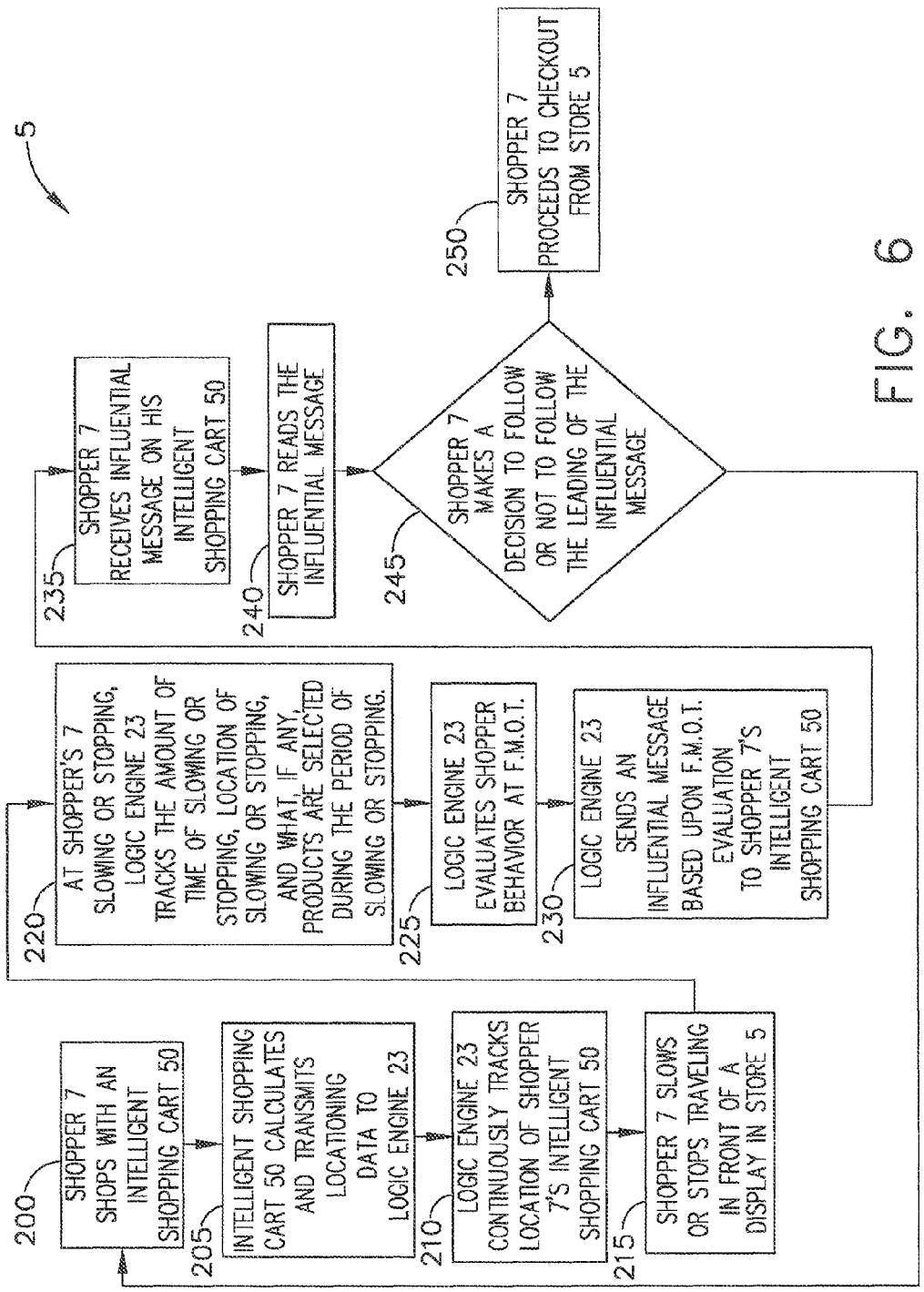
FIG. 6 provides a flowchart of an alternative embodiment of the system and method for calculating, storing and keeping track of the location of the presumed location of a shopper with the store.

FIG. 6 provides a flowchart of one embodiment of the system and method for influencing shopper 7 at the first moment of truth by transmitting messages to shopper 7's intelligent shopping cart 50 through a communications multi-network 10 in retail establishment 5. In Step 200 of FIG. 6, shopper 7 begins shopping with intelligent shopping cart 50. In most embodiments, when shopper 7 begins shopping with intelligent shopping cart 50, shopper 7 scans her preferred shopper card when the intelligent shopping cart 50 (and incorporated wireless end device) is assigned to shopper 7, making retail establishment 5 immediately aware of shopper 7's identity. In Step 205, intelligent shopping cart 50, which is in close proximity to shopper 7 as she shops, continuously calculates and transmits location data to logic engine 23. Logic engine 23 receives location data from shopper 7's intelligent shopping cart 50. In embodiments where intelligent shopping cart 50 includes a wireless end device which is a reduced function device, the coordinates of the closest multi-network routers 11 will be transmitted from intelligent shopping cart 50 to logic engine 23 where the location data will be calculated by logic engine 23.

Step 210 shows that logic engine 23 continuously tracks the location of intelligent shopping cart 50 in close proximity to shopper 7. The use of the word "continuously" as used herein is defined as the increment determined by the software operator. For instance, the interval of time can be, but is not limited to, every 3 seconds, every 5 seconds, or every 10 seconds. The interval can vary depending on the specific application contemplated.

Then, as shown in Step 215, shopper 7 slows or stops traveling through the store in front of products and experiences a first moment of truth. Logic engine 23 is programmed with software that recognizes when shopper 7 is experiencing a first moment of truth when shopper's speed slows to a certain speed or when a shopper stops in front of a display for a certain period of time (e.g., three seconds). At Step 220, when shopper 7 slows or stops in front of products, logic engine 23 tracks the amount of time of slowing or stopping, the location of the slowing or stopping, and the identity of the products selected by shopper (if any are selected at all) during the period of the slowing or the stopping of travel throughout retail establishment 5. In Step 225, logic engine 23 evaluates the information collected during step 220 to determine whether shopper 7 is experiencing a first moment of truth.

To determine a first moment of truth, the logic engine 23 compares the shopper location data to the product location map to produce a shopper to product location ratio. When the product to location ratio is under about five feet, the logic engine 23 begins timing the amount of time that the shopper 7 is in close proximity to the product. When shopper 7 selects the product and scans it with her wireless scanning device, thereby creating product selection data, the logic engine 23 stops timing using the difference between the time of day when the shopper 7 selected the product and the first moment the product location ratio was under about five feet. The logic engine 23 evaluates the intended product purchase of the shopper, the shopper to product location ratio, and the product selection timing data to produce an evaluation data. The logic engine determines whether the evaluation data indicates a first moment of truth.

In Step 230, if it is determined that the shopper 7 is experiencing a first moment of truth based on the evaluation data, logic engine 23 transmits to shopper 7, via her intelligent shopping cart 50, an appropriate influential message based on the first moment of truth evaluation. In Step 235, shopper 7 receives the influential message on her intelligent shopping cart 50. Ideally, while experiencing a first moment of truth, shopper 7 reads the influential message on her intelligent shopping cart 50 as shown in Step 240.

At this point in time, in Step 245, shopper 7 makes a decision either to follow or not to follow the leading of the influential message. For instance, when the influential message recommends a substitute product for the one scanned by shopper, at Step 245 shopper 7 decides to purchase the item the influential message recommended. In other embodiments, the shopper 7 is influenced by the influential message to purchase a different quantity of products than shopper 7 originally contemplated at her first moment of truth. In still other embodiments, the shopper 7 decides to purchase a different product than the product selected and scanned, returning the original product to the shelf and scanning the suggested product. After shopper's decision in Step 245, shopper 7 either continues to shop (returning to Step 200) or proceeds to check out the items already selected (Step 250).

FIG. 7 provides a frontal view of a wireless end device 40 with multiple interface keys 42. Wireless end devices 40 are used by at least one of the following: a manager, a store associate, and a shopper. In some embodiments, a shopper tracking device is housed within each wireless end device 40. Wireless end device 40 is battery powered and can be rechargeable. It has the ability to seek out and associate itself (i.e. attach itself wirelessly) to an existing communications multi-network 10 herein. Wireless end device 40 herein is either a reduced function device or a full function device, but a reduced function device can be chosen for its lower power consumption. In some embodiments, wireless end device 40 includes a product scanning device (not shown) and an imager useful for scanning items by shopper 7 for placement of the scanned items into a shopping cart (intelligent 50 or non-intelligent; not shown) and for taking photographs.

The wireless end device 40 serves substantially as a device that receives information from and transmits information to communications multi-network 10. In FIG. 7, wireless end device 40 is shown including interface keys 42. While each multiple interface key 42 denotes a function that occurs, most of the multiple interface keys 42 actually provide a requested transmission to or from other devices attached to the communications multi-network 10 (not shown) rather than requiring the wireless end device 40 to perform computational functions. In some embodiments, wireless end device 40 transmits information to other devices attached to the multi-network 10, such as the logic engine 23 or other devices capable of performing computational functions, for computation.

Computational functions include, but are not limited to, ray tracing calculations, price calculations, and budget calculations. Therefore, the interface keys 42 shown on wireless end device 40 in FIG. 7 are not meant to imply the actuation of a function within wireless end device 40 other than the receipt or transmission of information from communications multi-network 10 and whatever key types are used on the wireless end device 40 result in very little, or even no, computation, because logic engine 23 or location tracking server 31 performs the ray tracing calculations. By this use of interface keys 42, necessary hardware for computation functions like the calculating of its X and Y positional coordinates on the store grid is alleviated.

For example, wireless end device 40 does not itself substantially compute or keep a running total of the cost of items previously scanned and placed into intelligent shopping cart 50. Instead, cart key 44, when depressed, signals to communications multi-network 10 that wireless end device 40 is ready to scan an item that is to be placed into shopping cart 50 after the item has been scanned. Information on the item scanned is transmitted wirelessly through communications multi-network 10 and ultimately routed to logic engine 23 or location tracking server 31 for storage and/or further processing.

It should be noted herein that FIG. 7 is exemplary and the types, configurations, and orientation of the buttons shown form no part of the invention. A myriad of key types, sizes, shapes, configurations, symbols, graphics, etc. can be created to fit within the scope and purpose of wireless end device 40 depending on the specific application contemplated.

When wireless end device 40 is configured to do little or no computation, wireless end device 40 is extremely cost effective to build and put into use. Since lower priced components are used (i.e., high speed processor and memory) wireless end device 40 is subject to less theft. Furthermore, even if theft of the wireless end device 40 does occur, its replacement cost is much less than the per-unit costs of more complex devices. When wireless end device 40 lacks a high speed processor and memory, it also lacks the significant amount of software of other devices that depend upon high speed processors and large sophisticated memory types. Additionally, because of the low per-unit cost of wireless end device 40, more units can be deployed to a greater number of shoppers of retail establishment 5. Wireless end device 40 can also be used in multiple grocery stores, so long as each store possesses a compatible communications multi-network 10 usable by wireless end device 40.

In other embodiments, wireless end device 40 performs certain complex computational functions, at least partially, within its circuitry, i.e., within its microcontrollers. For example, it performs the ray tracing calculations to determine its own location on the two dimensional grid superimposed on the map of the store. In this embodiment, the logic engine 23 or the appropriate store server, such as location tracking server 31, acts as a back-up to a full function wireless end device 40 in the case of a computational or other type of outage in wireless end device 40.

Wireless end device 40, whether or not it has computational capabilities, comprises at least one MCU. In some embodiments, the MCU herein is a system-on-a-chip type of MCU. The MCU herein comprises a control unit, one or more registers, an amount of read only memory (ROM), an amount of random access memory (RAM), and an arithmetic logic unit (ALU). In embodiments where the wireless end device 40 does not perform all of the computational work, the ALU will be accessed very little, if at all, for any calculations within wireless end device 40. In embodiments of wireless end device 40 where the device itself performs the majority of the computational work, the ALU will be accessed, and therefore used, for computations.

In some embodiments, wireless end device 40 includes at least two MCUs. One MCU receives and transmits information from wireless end device 40 to the mesh communication network 14. Another MCU receives and transmits information from wireless end device 40 to the star communication network 16. The Texas Instruments CC2431 MCU is preferred herein because of its ability to transmit data for both mesh communication network 14 and star communication network 16. Also, the CC2431 MCU provides location detection functions within communications multi-network 10 herein. Such location detection is an important, preferred function because it allows any device so equipped (whether wireless end devices 40, intelligent shopping cart 50, or multi-network routers 11) to be found and located anywhere within communications multi-network 10.

The technical specifications for the CC2431 MCU are the following: 32 MHz single-cycle low power 8051 MCU; 2.4 GHz IEEE 802.15.4 compliant RF transceiver; 128 KB in-system programmable flash; ultra low power requirements; ZIGBEE protocol stack (Z-STACK) operable; and 8 Kbyte SRAM, 4 Kbyte with data retention in all power modes. The CC2431 is a true system-on-chip (SOC) for wireless sensor networking ZIGBEE/IEEE 802.15.4 solutions. The CC2431 includes a location detection hardware module that can be used to locate either wireless end device 40 or an intelligent shopping cart 50 within communications multi-network 10. Based on this, the location engine calculates an estimate of an unknown wireless end device's 40 or intelligent shopping cart's 50 position within communications multi-network 10.

In addition to the MCUs used for information flow and management along mesh communication network 14 and star communication network 16, at least one governing MCU is employed within wireless end device 40. This governing MCU governs, evaluates, sends messages to, receives information from, and manages the other MCUs configured to send and receive information along mesh communication network 14 and star communication network 16. The MSP430 built by Texas Instruments is a preferred model for a governing MCU. The MSP430 is a microcontroller built around a 16-bit processor that is designed for low cost and low power consumption embedded applications. It is particularly well suited for wireless radio frequency (RF) or battery powered applications. The current draw in idle mode can be less than 1 microampere. Its top processor speed is 16 MHz. It can be throttled back for lower power consumption. The MSP430 does not have an external memory bus. It is therefore limited to on-chip memory and preferably comprises up to 128 KB flash memory and 10 KB RAM.

In embodiments in which communications multi-network 10 contains multiple star communication networks 16, an exemplary configuration of the internal hardware of wireless end device 40 includes two MCUs responsible for communication with communications multi-network 10 and a governing MCU that governs all other needful functions within wireless end device 40. In this configuration, one of the two MCUs is always associated with and wirelessly connected to communications multi-network 10. The other MCU, when it is not wirelessly connected to communications multi-network 10, searches for the strongest radio signal transmitted by communications multi-network 10 to connect to the communications multi-network 10. If a signal sensed by the un-associated MCU becomes stronger than a signal transmitted by the currently associated star communication network 16, the un-associated MCU will convert to associated status and the formerly associated MCU will convert to un-associated status and then begin to seek the strongest radio signal available from communications multi-network 10. Such process of association and un-association between the MCUs occurs continually as shopper 7 moves about a store and moves from one star communication network 16 to another star communication network 16 located within retail establishment 5.

In alternative embodiments in which communications multi-network 10 comprises multiple star communication networks 16 and no mesh communication networks 14, two MCUs (preferably Texas Instruments CC2431) responsible for simultaneous receipt and transmission of information from wireless end device 40 are both associated with communications multi-network 10. Such a dual association enables the transmission of larger packets of data from or to wireless end device 40. These larger packets of data may include voice data, video, and other data types whose wireless transmission (i.e., between wireless end device 40 and communications multi-network 10) is best facilitated by a 256 KB/s transmission rate or higher.

Figure 8A:
FIGS. 8A-8D provide a depiction of a shopper selecting product from an end cap in a store during the shopper's moment of decision.
Figure 8B:
Figure 8C:
Figure 8D:

FIG. 8A through FIG. 8D depict a shopper's 7 product selection process of items for purchase from an end cap 22 during the shopper's First Moment of Truth in the store. While these figures depict the end cap, the process may be used for a kiosk, a display, or any other grouping of products that are not placed on one or more standard store shelves. FIGS. 8A-8D are meant to capture, pictorially, the experience 30 had by the shopper at the First Moment of Truth in the store. FIG. 9A shows the shopper just as he approaches end cap 22 in store 5. Shopper 7 in FIGS. 8A, 8B, 8C and 8D is shown to possess 35 a First Moment of Truth device 50 (i.e., a wireless end device 40 or personal device 45 (not shown)), While shopping, a shopper's presumed locations are tracked as he maneuvers throughout the store with First Moment of Truth device 50. In FIG. 8A shopper 7 is shown stopped at end cap 22 while he considers his purchasing options. In one example herein, shopper 7 stands before a great array of, for example, laundry detergent options. In FIG. 8B, shopper 7 has selected product 35 from end cap 22. In FIG. 8C, shopper 7 scans the readable media (not shown) on selected product 35. At such scanning of product 35, several important functions occur, each of which will be described in turn.

First, the identity of the scanned product 35 is transmitted by FMOT device 50 through store communication network 10 such transmissions being received through one or more information routers 12 and ultimately transferred to logic engine 23. Second, the moment in time of the shopper's product selection is also recorded and stored by logic engine 23. The amount of time that shopper 7 spends deliberating his product selection choice is also known since his travel through the store can be assessed on a moment by moment basis in actual real time.

This time can be tracked by either a timing device in the FMOT device 50 or the data collections device 23. This tracked time is referred to herein as product selection timing data. Third, since the position of shopper 7 in store 5 is known in actual real-time, such position is attached to the identity of selected product 35. Finally, the transaction is completed and the selected product is chosen, shopper 7 is shown placing selected product 35 into the shopping cart as an indication that product 35 has been actually selected for purchase and not just considered for purchase.

The following examples are meant to provide three possible situations in which the combination of the technical elements of the invention with a shopper's real world product selection processes are illustrated. They are not meant to be all encompassing. Persons of skill will readily recognize that many more examples with use of the system herein can be used and that the examples provided herein are not limiting.

Example I

A shopper enters a retail establishment of the type described at length herein. The shopper is provided a wireless end device by the retail establishment and begins to proceed about her shopping trip. Coming to an end cap display of laundry detergent, the shopper picks up a popular brand on display intending to scan its bar code. The brand of laundry detergent is one with which the shopper is familiar and has used often. The shopper scans the bar code on the product package of the laundry detergent and places the detergent into her shopping cart. Her time of decision upon seeing the end cap and drawing within selection distance thereof is estimated at between about two to about five seconds.

Example II

A shopper enters a retail establishment of the type described at length herein. The shopper has his own personal wireless device (e.g., a smartphone) that is configured to connect to the retail establishment's communications multi-network. Upon reaching the aisle in the retail establishment that contains his customary choice of a brewed beverage, the shopper is sent an inducement from the logic engine through the communications multi-network. This inducement comprises an offer for a competitive product. The inducement may be a coupon that makes the competitive product less expensive to purchase. The shopper, in reaction, to the inducement fails to choose his customary product and instead selects the new offering. It is important to note herein that the inducement arrived to the shopper's personal wireless device when the customary approached the subject product aisle or during the shopper's first moment of truth experience.

Example III

A shopper enters a retail establishment of the type described at length herein. The shopper is provided a wireless end device by the retail establishment and begins to proceed about her shopping trip. The shopper enters the produce section preparing to select a pre-determined fruit or vegetable. The shopper receives an inducement from the logic engine to make a different choice for another fruit or vegetable offering or an inducement to influence the shopper to purchase more than what the shopper had originally intended on purchasing. The shopper rejects the choice offered by the inducement and instead proceeds to make her pre-determined choice of fruit or vegetable. The logic engine records her choice, the time to make her choice, the rejection of the inducement and the time of consideration of the inducement itself. The logic engine may also follow-up with the shopper to query her about why the inducement failed. This response, whether provided or not, is also recorded by the logic engine.

While various embodiments of the present invention have been described above, it should be understood that they have been presented by way of example, and not limitation. It will be apparent to persons skilled in the relevant art(s) that various changes in form and detail can be made therein without departing from the scope of the present invention. Thus, embodiments of the present invention should not be limited by any of the above described exemplary embodiments, but should be defined only in accordance with the following claims and their equivalents.

What is claimed is:

1. A system of influencing a shopper's product selection based upon said shopper's location in a retail establishment, comprising:
   i) a communications multi-network positioned about said retail establishment, said communications multi-network comprising at least one mesh communication network and at least one star communication network;
   ii) a logic engine operatively connected to said communications multi-network, said logic engine managing said communications multi-network; and
   iii) a shopper tracking device positioned into close proximity to said shopper whereby said shopper tracking device creates shopper location data, said shopper tracking device being in tracked communication through said at least one mesh communication network of said communications multi-network with said logic engine;
   whereby said logic engine creates at least one influential message based upon shopper behavior data and said shopper location data and delivers said at least one influential message through said star communication network to said shopper.

2. The system of claim 1, further comprising a map of said retail establishment showing each physical element of said retail establishment wherein a two-dimensional X and Y grid is juxtaposed on top of said map of said retail establishment to provide said each physical element on said map of said retail establishment is assigned a set of X and Y positional coordinates.

3. The system of claim 1, further comprising a product location map is provided, wherein said logic engine stores product location data of products positioned about said retail establishment.

4. The system of claim 3 wherein said logic engine compares said shopper location data with said product location data.

5. The system of claim 1 wherein said shopper is provided a wireless end device that comprises said shopper tracking device whereby said logic engine transmits said at least one influential message to said wireless end device through said star communication network.

6. The system of claim 5 wherein said wireless end device is previously assigned to said shopper.

7. The system of claim 5 wherein said wireless end device is communicatively coupled to an intelligent shopping cart that is electronically associated with said communications multi-network.

8. The system of claim 1 wherein said system tracks said shopper's first moment of truth by said shopper's duration of location in said retail environment.

9. The system of claim 1 wherein said system tracks said shopper's first moment of truth by said product selection data gathered from said shopper tracking device.

10. The system of claim 1 wherein said appropriate influential message comprises targeted product information concerning a targeted product that is located in an aisle proximate to said shopper location data collected by the logic engine.

11. The system of claim 1 wherein said appropriate influential message comprises targeted product information concerning a targeted product that is located in an aisle that is distant from said shopper location data collected by the logic engine.

12. The system of claim 1 wherein said appropriate influential message is transmitted prior to said shopper's product selection.

13. The system of claim 1 wherein said appropriate influential message is transmitted during said shopper's product selection.

14. The system of claim 1 wherein said appropriate influential message comprises targeted product information concerning a targeted product generated from said product selection location data wherein said targeted product is located in an aisle proximate to said shopper location data collected by the logic engine.

15. The system of claim 1 wherein said influential message is transmitted after said shopper's product selection.

16. The system of claim 1 wherein the form of said appropriate influential message is selected from the group consisting of a text message, a video, an electronic photograph, an illustration, a hyperlink, an audio message, a vibration and mixtures thereof.

17. The system of claim 1 wherein said appropriate influential message is selected from the group consisting of: a competitive saving opportunity, a co-branding opportunity, a product warning, a product combination warning, a product review, a response to a historical progression, a recipe, a complementary item to the shopper's shopping list, health awareness alert, product ingredient information, internal store maps and an electronic coupon.

18. The system of claim 1 wherein said shopper behavior data includes actual, real time shopper behavior data generated by said shopper.

19. The system of claim 18 wherein said logic engine organizes said actual, real time shopper behavior data into said shopper's electronic profile.

20. The system of claim 19 wherein said logic engine uses said electronic profile to deliver said influential message to said shopper tracking device at a time selected from the group consisting of prior to product selection, during said product selection, and substantially immediately after said product selection.

* * * * *